(12) United States Patent
Huang et al.

(10) Patent No.: US 11,841,550 B2
(45) Date of Patent: Dec. 12, 2023

(54) IMAGING OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Hsin-Hsuan Huang, Taichung (TW); Yu Chen Lai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 598 days.

(21) Appl. No.: 16/989,697

(22) Filed: Aug. 10, 2020

(65) Prior Publication Data
US 2021/0364738 A1    Nov. 25, 2021

(30) Foreign Application Priority Data
May 20, 2020    (TW) .................................. 109116645

(51) Int. Cl.
*G02B 9/62*    (2006.01)
*G02B 27/00*   (2006.01)
(Continued)

(52) U.S. Cl.
CPC ........... *G02B 9/62* (2013.01); *G02B 13/0045* (2013.01); *G02B 13/02* (2013.01); *G02B 27/0025* (2013.01)

(58) Field of Classification Search
CPC ............... G02B 13/0015; G02B 13/22; G02B 13/0065; G02B 13/02; G02B 13/0045;
(Continued)

(56) References Cited

U.S. PATENT DOCUMENTS 5,691,850 A    11/1997  Arisaka
8,472,128 B2    6/2013  Huang
(Continued)

FOREIGN PATENT DOCUMENTS

CN    107065133 A    8/2017
CN    206710686 U    12/2017
(Continued)

OTHER PUBLICATIONS

TW Office Action in Application No. 109116645 dated Sep. 28, 2020.
(Continued)

*Primary Examiner* — Travis S Fissel
(74) *Attorney, Agent, or Firm* — Maschoff Brennan

(57) ABSTRACT

An imaging optical lens assembly includes six lens elements which are, in order from an object side to an image side along an optical path: a first lens element, a second lens element, a third lens element, a fourth lens element, a fifth lens element and a sixth lens element. The first lens element has an object-side surface being concave in a paraxial region thereof and an image-side surface of the first lens element being convex in a paraxial region thereof. The third lens element has an image-side surface being concave in a paraxial region thereof. The sixth lens element has an image-side surface being concave in a paraxial region thereof. The image-side surface of the sixth lens element is aspheric and has at least one inflection point. At least one of the six lens elements is made of plastic material.

32 Claims, 29 Drawing Sheets

(51) Int. Cl.
*G02B 13/02* (2006.01)
*G02B 13/00* (2006.01)

(58) Field of Classification Search
CPC .... G02B 15/146; G02B 27/0025; G02B 9/62; G02B 9/64; H04N 5/2254; H04N 5/222
USPC ......... 359/656–658, 708, 713, 749, 756–762
See application file for complete search history.

(56) References Cited

U.S. PATENT DOCUMENTS

| | | | |
|---|---|---|---|
| 9,013,807 B1 | 4/2015 | Tsai et al. | |
| 9,651,759 B2 | 5/2017 | Huang | |
| 10,241,297 B1* | 3/2019 | Oinuma | G02B 27/0025 |
| 10,353,176 B2 | 7/2019 | Hsu et al. | |
| 10,386,602 B2 | 8/2019 | Chen et al. | |
| 2016/0139366 A1 | 5/2016 | Jung | |
| 2016/0161716 A1 | 6/2016 | Chae | |
| 2016/0282588 A1* | 9/2016 | Sekine | G02B 13/0045 |
| 2017/0329103 A1 | 11/2017 | Lai et al. | |
| 2017/0329104 A1 | 11/2017 | Lai et al. | |
| 2018/0011294 A1 | 1/2018 | Lai et al. | |
| 2018/0011295 A1 | 1/2018 | Lai et al. | |
| 2018/0045918 A1* | 2/2018 | Seo | G02B 9/60 |
| 2018/0231741 A1 | 8/2018 | Dai | |
| 2018/0335611 A1 | 11/2018 | Chen et al. | |
| 2019/0025558 A1 | 1/2019 | Chen et al. | |
| 2020/0209573 A1 | 7/2020 | Yamazaki et al. | |
| 2020/0209584 A1 | 7/2020 | Guo et al. | |
| 2020/0218037 A1 | 7/2020 | Seo et al. | |
| 2021/0072515 A1* | 3/2021 | Chang | G02B 17/08 |

FOREIGN PATENT DOCUMENTS

| | | |
|---|---|---|
| CN | 206757161 U | 12/2017 |
| CN | 108363162 A | 8/2018 |
| CN | 108469669 A | 8/2018 |
| CN | 109828348 A | 5/2019 |
| CN | 109870785 A | 6/2019 |
| CN | 110286472 | 9/2019 |
| CN | 110716288 A | 1/2020 |
| CN | 110780422 A | 2/2020 |
| CN | 111352211 A | 6/2020 |
| JP | H07-270688 A | 10/1995 |
| JP | H1123970 A | 1/1999 |
| JP | 2002-131631 A | 5/2002 |
| TW | 201901218 A | 1/2019 |
| TW | 201925843 A | 7/2019 |
| TW | 201932899 A | 8/2019 |
| TW | M593560 U | 4/2020 |
| TW | M594155 U | 4/2020 |
| WO | 2018-010245 | 1/2018 |
| WO | 2018/010245 A1 | 1/2018 |
| WO | 2019/066251 A1 | 4/2019 |
| WO | 2019/137055 A1 | 7/2019 |

OTHER PUBLICATIONS

Chinese Office Action dated May 27, 2022 as received in application No. 202010511052.0.

* cited by examiner

IMAGING OPTICAL LENS ASSEMBLY, IMAGE CAPTURING UNIT AND ELECTRONIC DEVICE

RELATED APPLICATIONS

This application claims priority to Taiwan Application 109116645, filed on May 20, 2020, which is incorporated by reference herein in its entirety.

BACKGROUND

Technical Field

The present disclosure relates to an imaging optical lens assembly, an image capturing unit and an electronic device, more particularly to an imaging optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The object-side surface of the first lens element is concave in a paraxial region thereof. The image-side surface of the first lens element is convex in a paraxial region thereof. The image-side surface of the third lens element is concave in a paraxial region thereof. The image-side surface of the sixth lens element is concave in a paraxial region thereof, and the image-side surface of the sixth lens element is aspheric and has at least one inflection point. At least one of the six lens elements is made of plastic material.

When an axial distance between the object-side surface of the first lens element and an image surface is TL, a focal length of the imaging optical lens assembly is f, an axial distance between the image-side surface of the second lens element and the object-side surface of the third lens element is Dr4r5, and an axial distance between the third lens element and the fourth lens element is T34, the following conditions are satisfied:

$0.70 < TL/f < 5.0$; and $4.20 < Dr4r5/T34$.

According to another aspect of the present disclosure, an imaging optical lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The object-side surface of the first lens element is concave in a paraxial region thereof. The image-side surface of the first lens element is convex in a paraxial region thereof. The image-side surface of the sixth lens element is concave in a paraxial region thereof, and the image-side surface of the sixth lens element is aspheric and has at least one inflection point. In addition, the imaging optical lens assembly further includes an aperture stop.

When an axial distance between the object-side surface of the first lens element and an image surface is TL, a focal length of the imaging optical lens assembly is f, an axial distance between the image-side surface of the second lens element and the object-side surface of the third lens element is Dr4r5, a sum of central thicknesses of all lens elements of the imaging optical lens assembly is $\Sigma CT$, and an axial distance between the aperture stop and the image surface is SL, the following conditions are satisfied:

$0.70 < TL/f < 5.0$;

$0.30 < Dr4r5/\Sigma CT < 2.50$; and $0.80 < SL/TL < 2.0$.

According to another aspect of the present disclosure, an imaging optical lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The object-side surface of the first lens element is concave in a paraxial region thereof. The image-side surface of the second lens element is convex in a paraxial region thereof. The image-side surface of the sixth lens element is concave in a paraxial region thereof, and the image-side surface of the sixth lens element is aspheric and has at least one inflection point.

When an axial distance between the object-side surface of the first lens element and an image surface is TL, a focal length of the imaging optical lens assembly is f, an axial distance between the image-side surface of the second lens element and the object-side surface of the third lens element is Dr4r5, and a sum of central thicknesses of all lens elements of the imaging optical lens assembly is $\Sigma CT$, the following conditions are satisfied:

$1.25 < TL/f < 2.60$; and $0.30 < Dr4r5/\Sigma CT < 2.50$.

According to another aspect of the present disclosure, an imaging optical lens assembly includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The imaging optical lens assembly further comprises a reflector disposed between the first lens element and the sixth lens element. At least one of the six lens elements has at least one inflection point, and at least one of the six lens elements is made of plastic material.

When an axial distance between the object-side surface of the first lens element and an image surface is TL, a focal length of the imaging optical lens assembly is f, a maximum effective radius of the object-side surface of the first lens element is Y11, a maximum image height of the imaging optical lens assembly is ImgH, and half of a maximum field of view of the imaging optical lens assembly is HFOV, the following conditions are satisfied:

$0.70 < TL/f < 5.0;$ $0.03 < Y11/ImgH < 0.50;$ and $27.0 \text{ [deg.]} < HFOV < 60.0 \text{ [deg.]}.$ According to another aspect of the present disclosure, an image capturing unit includes one of the aforementioned imaging optical lens assemblies and an image sensor, wherein the image sensor is disposed on the image surface of the imaging optical lens assembly. In addition, a height of the image capturing unit is smaller than 8.0 mm.

According to another aspect of the present disclosure, an image capturing unit includes one of the aforementioned imaging optical lens assemblies and an image sensor, wherein the image sensor is disposed on the image surface of the imaging optical lens assembly. In addition, a short side length of an opening of the image capturing unit is smaller than 2.500 mm.

According to another aspect of the present disclosure, an electronic device includes a display panel and an image capturing unit, wherein the display panel and the image capturing unit are disposed on the same side of the electronic device. The image capturing unit includes one of the aforementioned imaging optical lens assemblies and an image sensor disposed on the image surface of the imaging optical lens assembly.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens assembly includes six lens elements. The six lens elements are, in order from an object side to an image side along an optical path, a first lens element, a second lens element, a third lens element, a fourth lens element, a fifth lens element and a sixth lens element. Each of the six lens elements of the imaging optical lens assembly has an object-side surface facing toward the object side and an image-side surface facing toward the image side.

The object-side surface of the first lens element can be concave in a paraxial region thereof, and the image-side surface of the first lens element can be convex in a paraxial region thereof. Therefore, it is favorable for controlling the effective diameter of entrance pupil so as to reduce the opening of the image capturing unit to meet the product appearance requirements.

The second lens element can have positive refractive power. Therefore, it is favorable for the imaging optical lens assembly to obtain a compact configuration. The object-side surface of the second lens element can be concave in a paraxial region thereof, and the image-side surface of the second lens element can be convex in a paraxial region thereof. Therefore, it is favorable for controlling the incident angle and refraction angle of light on the second lens element so as to prevent total reflection due to an overly large refraction angle.

The third lens element can have negative refractive power. Therefore, it is favorable for correcting chromatic aberration. The image-side surface of the third lens element can be concave in a paraxial region thereof. Therefore, it is favorable for correcting spherical aberration and coma.

The fourth lens element can have positive refractive power. Therefore, it is favorable for balancing aberrations generated by the third lens element so as to correct overall aberrations. The image-side surface of the fourth lens element can be convex in a paraxial region thereof. Therefore, it is favorable for the light convergence of the fourth lens element so as to obtain a compact configuration.

The object-side surface of the fifth lens element can be convex in a paraxial region thereof. Therefore, it is favorable for improving the symmetry of the imaging optical lens assembly so as to enhance image quality. The image-side surface of the fifth lens element can be concave in a paraxial region thereof. Therefore, it is favorable for reducing the back focal length of the imaging optical lens assembly and correcting off-axis aberrations.

The object-side surface of the sixth lens element can be convex in a paraxial region thereof. Therefore, it is favorable for correcting astigmatism. The image-side surface of the sixth lens element can be concave in a paraxial region thereof. Therefore, it is favorable for reducing the back focal length so as to achieve compactness.

Figure 27:
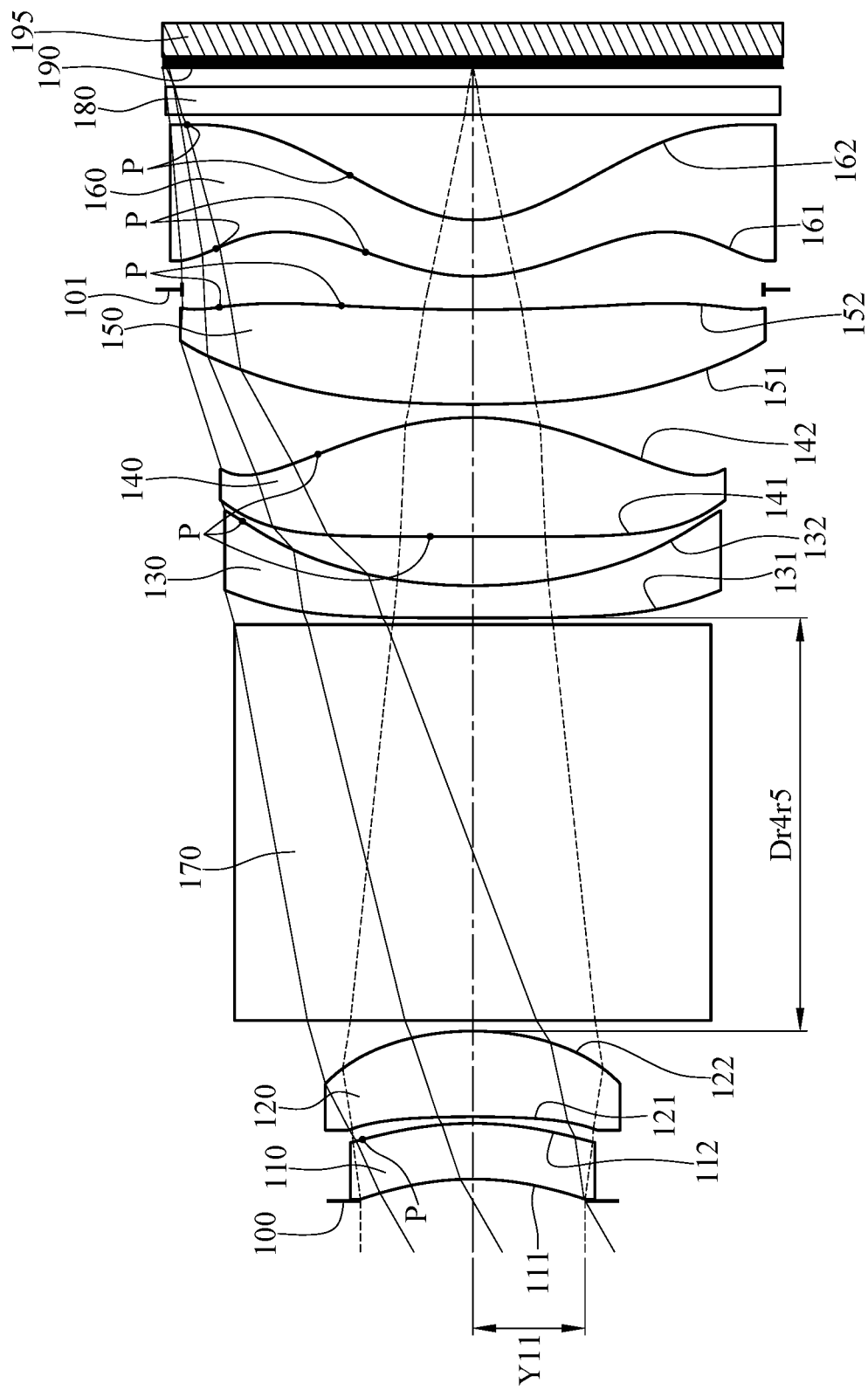
FIG. 27 shows a schematic view of Y11, Dr4r5 and inflection points of some of the lens elements according to the 1st embodiment of the present disclosure.

According to the present disclosure, at least one of the object-side surface and the image-side surface of at least one lens element of the imaging optical lens assembly can have at least one inflection point. Therefore, it is favorable for correcting distortion so as to prevent deformation at the periphery of the image. In one configuration, the object-side surface of the sixth lens element can have at least one inflection point. Therefore, it is favorable for controlling the incident angle of light on an image surface so as to maintain peripheral image brightness. Moreover, the image-side surface of the sixth lens element can be aspheric and have at least one inflection point. Therefore, it is favorable for enhancing distortion corrections. Please refer to FIG. 27, which shows a schematic view of inflection points P of the first lens element 110, the third lens element 130, the fourth lens element 140, the fifth lens element 150 and the sixth lens element 160 according to the 1st embodiment of the present disclosure. The inflection points of the first lens element, the third lens element, the fourth lens element, the fifth lens element and the sixth lens element in FIG. 27 are only exemplary. In other embodiments, each of the lens elements can have one or more inflection points.

There can be an air gap in a paraxial region between each of all adjacent lens elements of the imaging optical lens assembly; that is, each of the first through the sixth lens elements can be a single and non-cemented lens element. The manufacturing process of cemented lenses is more complex than the non-cemented lenses, particularly when an image-side surface of one lens element and an object-side surface of the following lens element need to have accurate curvatures to ensure both lenses being highly cemented. However, during the cementing process, those two lens elements might not be highly cemented due to misalignment and it is thereby not favorable for the image quality. Therefore, having an air gap in a paraxial region between each of all adjacent lens elements of the imaging optical lens assembly in the present disclosure is favorable for easy assembling so as to improve assembling yield rate.

When an axial distance between the object-side surface of the first lens element and the image surface is TL, and a focal length of the imaging optical lens assembly is f, the following condition is satisfied: $0.70 < TL/f < 5.0$. Therefore, it is favorable for balancing between the total track length and field of view of the imaging optical lens assembly for satisfying various product specifications. Moreover, the following condition can also be satisfied: $1.0 < TL/f < 3.0$. Moreover, the following condition can also be satisfied: $1.25 < TL/f < 2.60$.

When an axial distance between the image-side surface of the second lens element and the object-side surface of the third lens element is Dr4r5, and an axial distance between the third lens element and the fourth lens element is T34, the following condition can be satisfied: $4.20 < Dr4r5/T34$. Therefore, it is favorable for having a sufficient space between the second and third lens elements so as to accommodate additional opto-components for achieving various application designs. Moreover, the following condition can also be satisfied: $6.0 < Dr4r5/T34 < 20.0$. Please refer to FIG. 27, which shows a schematic view of Dr4r5 according to the 1st embodiment of the present disclosure.

When the axial distance between the image-side surface of the second lens element and the object-side surface of the third lens element is Dr4r5, and a sum of central thicknesses of all lens elements of the imaging optical lens assembly is ΣCT, the following condition can be satisfied: $0.30 < Dr4r5/\Sigma CT < 2.50$. Therefore, it is favorable for providing sufficient space for adjusting light path with a proper ratio of the distance between the second and third lens elements to the central thicknesses of the lens elements. Moreover, the following condition can also be satisfied: 0.75<Dr4r5/ΣCT<1.50.

According to the present disclosure, the imaging optical lens assembly further includes an aperture stop. When an axial distance between the aperture stop and the image surface is SL, and the axial distance between the object-side surface of the first lens element and the image surface is TL, the following condition can be satisfied: 0.80<SL/TL<2.0. Therefore, it is favorable for the position of the aperture stop so as to provide a smaller aperture at the object side of the imaging optical lens assembly. Moreover, the following condition can also be satisfied: 1.0<SL/TL<1.30.

Figure 28:
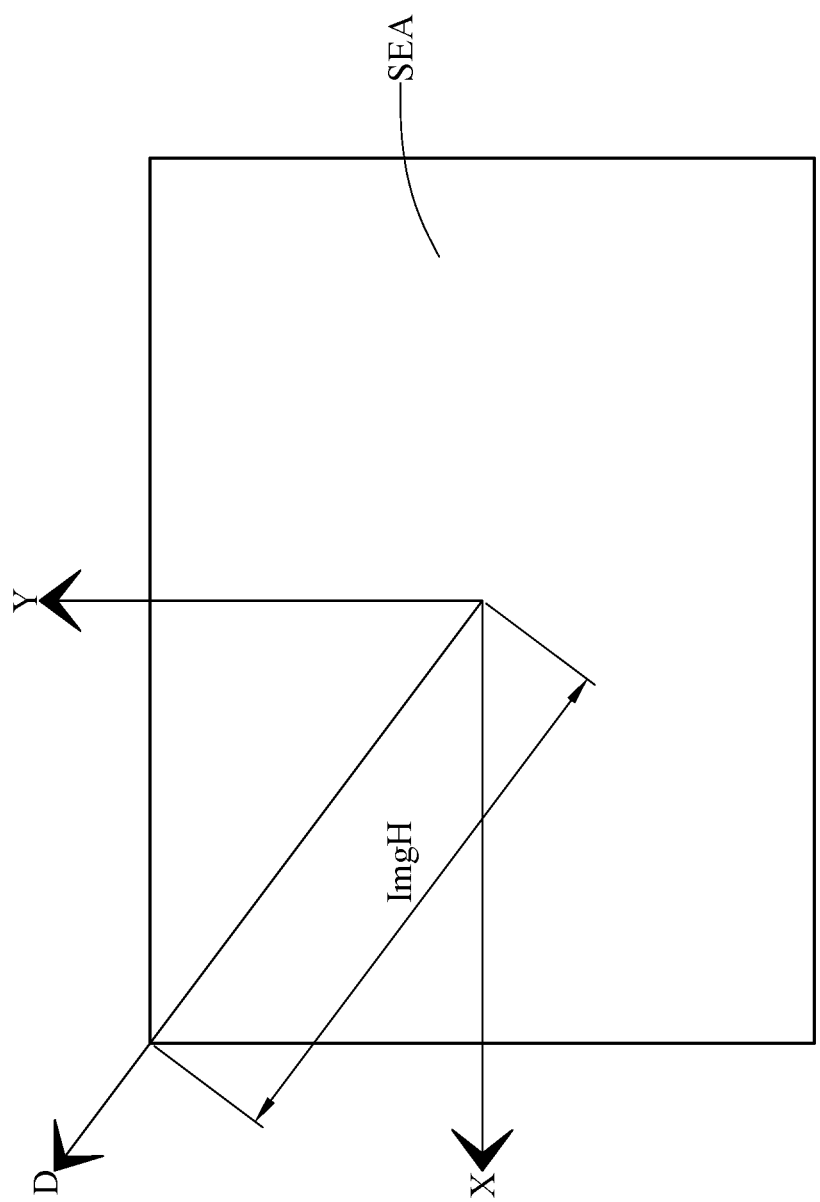
FIG. 28 shows a schematic view of an effective photosensitive area of an image sensor and ImgH according to one embodiment of the present disclosure.

When a maximum effective radius of the object-side surface of the first lens element is Y11, and a maximum image height of the imaging optical lens assembly (half of a diagonal length of an effective photosensitive area of an image sensor) is ImgH, the following condition can be satisfied: 0.03<Y11/ImgH<0.50. Therefore, it is favorable for receiving sufficient light while having a small aperture diameter. Moreover, the following condition can also be satisfied: 0.03<Y11/ImgH<0.40. Please refer to FIG. 27 and FIG. 28. FIG. 27 shows a schematic view of Y11 according to the 1st embodiment of the present disclosure, and FIG. 28 shows a schematic view of an effective photosensitive area SEA of an image sensor and ImgH according to one embodiment of the present disclosure. The effective photosensitive area SEA of the image sensor in FIG. 28 is rectangular, a direction corresponding to the length direction (i.e., the long side direction) of the effective photosensitive area SEA of the image sensor is the X-axis direction, a direction corresponding to the width direction (i.e., the short side direction) of the effective photosensitive area SEA of the image sensor is the Y-axis direction, and ImgH corresponds to the diagonal direction D of the effective photosensitive area SEA of the image sensor.

When half of a maximum field of view of the imaging optical lens assembly is HFOV, the following condition can be satisfied: 27.0 [deg.]<HFOV<60.0 [deg.]. Therefore, it is favorable for providing the most common imaging range for a majority of applications.

When an Abbe number of the first lens element is V1, the following condition can be satisfied: 10.0<V1<40.0. Therefore, it is favorable for the first lens element to control the light path while increasing the design flexibility for satisfying high-end product specifications. Moreover, the following condition can also be satisfied: 12.0<V1<30.0. Moreover, the following condition can also be satisfied: 12.0<V1<23.0.

When the focal length of the imaging optical lens assembly is f, and a focal length of the first lens element is f1, the following condition can be satisfied: −0.50<f/f1<0.50. Therefore, it is favorable for avoiding overly strong refractive power at the object side of the imaging optical lens assembly so as to prevent excessive refraction on the light path with smaller effective radii of the lens elements. Moreover, the following condition can also be satisfied: −0.30<f/f1<0.10.

When a curvature radius of the object-side surface of the second lens element is R3, and a curvature radius of the image-side surface of the second lens element is R4, the following condition can be satisfied: |R4/R3|<0.50. Therefore, it is favorable for controlling the light path at the image-side surface of the second lens element so as to reduce the refraction angle.

When a curvature radius of the object-side surface of the fourth lens element is R7, and a curvature radius of the image-side surface of the fourth lens element is R8, the following condition can be satisfied: 0.50<(R7+R8)/(R7−R8)<1.20. Therefore, it is favorable for the fourth lens element to have stronger refractive capability so as to control the light path.

When a minimum value among Abbe numbers of all lens elements of the imaging optical lens assembly is Vdmin, the following condition can be satisfied: 12.0<Vdmin<20.0. Therefore, it is favorable for correcting the focal points among different wavelengths so as to prevent image overlaps.

When the maximum image height of the imaging optical lens assembly is ImgH, and the focal length of the imaging optical lens assembly is f, the following condition can be satisfied: 0.53<ImgH/f<1.50. Therefore, it is favorable for having a better viewing angle for various applications.

When the focal length of the imaging optical lens assembly is f, and a focal length of the fourth lens element is f4, the following condition can be satisfied: 0.80<f/f4<2.0. Therefore, it is favorable for providing significant light convergence capability so as to control the size of the imaging optical lens assembly.

When a central thickness of the first lens element is CT1, and a central thickness of the fourth lens element is CT4, the following condition can be satisfied: 0.10<CT1/CT4<0.90. Therefore, it is favorable for controlling a ratio between the central thicknesses of the first and fourth lens elements so as to prevent the height of the image capturing unit from being overly large.

When the axial distance between the third lens element and the fourth lens element is T34, and an axial distance between the fourth lens element and the fifth lens element is T45, the following condition can be satisfied: 2.0<T34/T45<40.0. Therefore, it is favorable for spacing among the third, fourth, and fifth lens elements so as to reduce the sensitivity of the imaging optical lens assembly. Moreover, the following condition can also be satisfied: 2.30<T34/T45<25.0.

When a curvature radius of the image-side surface of the fourth lens element is R8, and a curvature radius of the object-side surface of the fifth lens element is R9, the following condition can be satisfied: −1.0<(R8+R9)/(R8−R9)<0. Therefore, it is favorable for balancing surface shapes between the fourth and fifth lens elements so as to better control the light path by the fourth lens element with corrections by the fifth lens element.

When the central thickness of the first lens element is CT1, and a central thickness of the second lens element is CT2, the following condition can be satisfied: CT1/CT2<0.90. Therefore, it is favorable for balancing the central thicknesses of the first and second lens elements so as to control the size of the imaging optical lens assembly.

When the maximum effective radius of the object-side surface of the first lens element is Y11, and a curvature radius of the object-side surface of the first lens element is R1, the following condition can be satisfied: −0.70<Y11/R1<0. Therefore, it is favorable for reducing the aperture of the image capturing unit with a sufficiently large field of view.

When the axial distance between the third lens element and the fourth lens element is T34, the axial distance between the fourth lens element and the fifth lens element is T45, and an axial distance between the fifth lens element and the sixth lens element is T56, the following condition can be satisfied: 0.80<T34/(T45+T56)<5.0. Therefore, it is favorable for balancing axial distances between lens elements so as to improve assembling yield rates.

When an f-number of the imaging optical lens assembly is Fno, the following condition can be satisfied: 1.0<Fno<2.80. Therefore, it is favorable for adjusting the entrance pupil diameter so as to increase image brightness with sufficient incident light. Moreover, the following condition can also be satisfied: 1.50<Fno 2.50.

According to the present disclosure, at least one reflector, such as a prism or a mirror, can be optionally disposed between an imaged object and the image surface on the imaging optical path, such that the imaging optical lens assembly can be more flexible in space arrangement, and therefore the dimensions of an electronic device is not restricted by the total track length of the imaging optical lens assembly. Moreover, the reflector can be disposed between the first lens element and the sixth lens element. Therefore, it is favorable for the imaging optical lens assembly to have different travelling directions of light so as to utilize the space therein with higher flexibility for satisfying high-end product specifications. Moreover, the reflector can be disposed between the second lens element and the third lens element. Moreover, when a refractive index of the reflector is Nr, the following condition can be satisfied: 1.530<Nr<1.540. Therefore, it is favorable for controlling the manufacturing costs and increasing the manufacturing feasibility of the imaging optical lens assembly. Please refer to FIG. 2, which shows a reflector (the reflective prism 170") disposed between the second lens element 120 and the third lens element 130 for reflecting incident light such that the optical path is folded at the reflector.

The imaging optical lens assembly can be optionally provided with two or more reflectors, and the present disclosure is not limited to the type, amount, light path direction and position of the reflectors of the embodiments disclosed in the aforementioned figures.

According to the present disclosure, the aperture stop can have a non-circular opening, and the non-circular opening can be a polygonal opening according to design requirements. Therefore, it is favorable for providing a matching appearance of the camera module with other electronic modules.

When a maximum value among refractive indices of all lens elements of the imaging optical lens assembly is Nmax, the following condition can be satisfied: 1.64<Nmax<1.75. Therefore, it is favorable for having sufficient refractive capability of the lens elements while controlling the manufacturing costs and improving the yield rate thereof.

Figure 29:
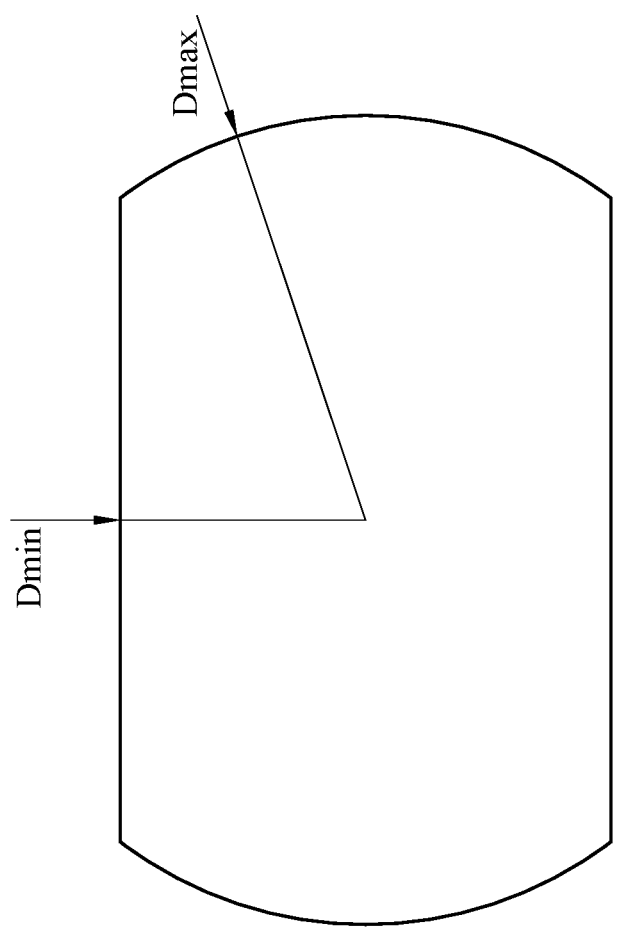
FIG. 29 is a schematic view of a configuration of one non-circular lens element according to one embodiment of the present disclosure.

According to the present disclosure, at least one of the six lens elements of the imaging optical lens assembly can be a non-circular lens element. When a minimum distance from a center to an outer diameter position of the non-circular lens element is Dmin, and a maximum distance from the center to the outer diameter position of the non-circular lens element is Dmax, the following condition can be satisfied: Dmin/Dmax<0.80. Therefore, it is favorable for reducing required space in the camera module so as to achieve compactness requirements. Please refer to FIG. 29, is a schematic view of Dmin, Dmax and a configuration of one non-circular lens element according to one embodiment of the present disclosure. Said outer diameter position of the lens element refers to the periphery of the lens element.

Figure 23:
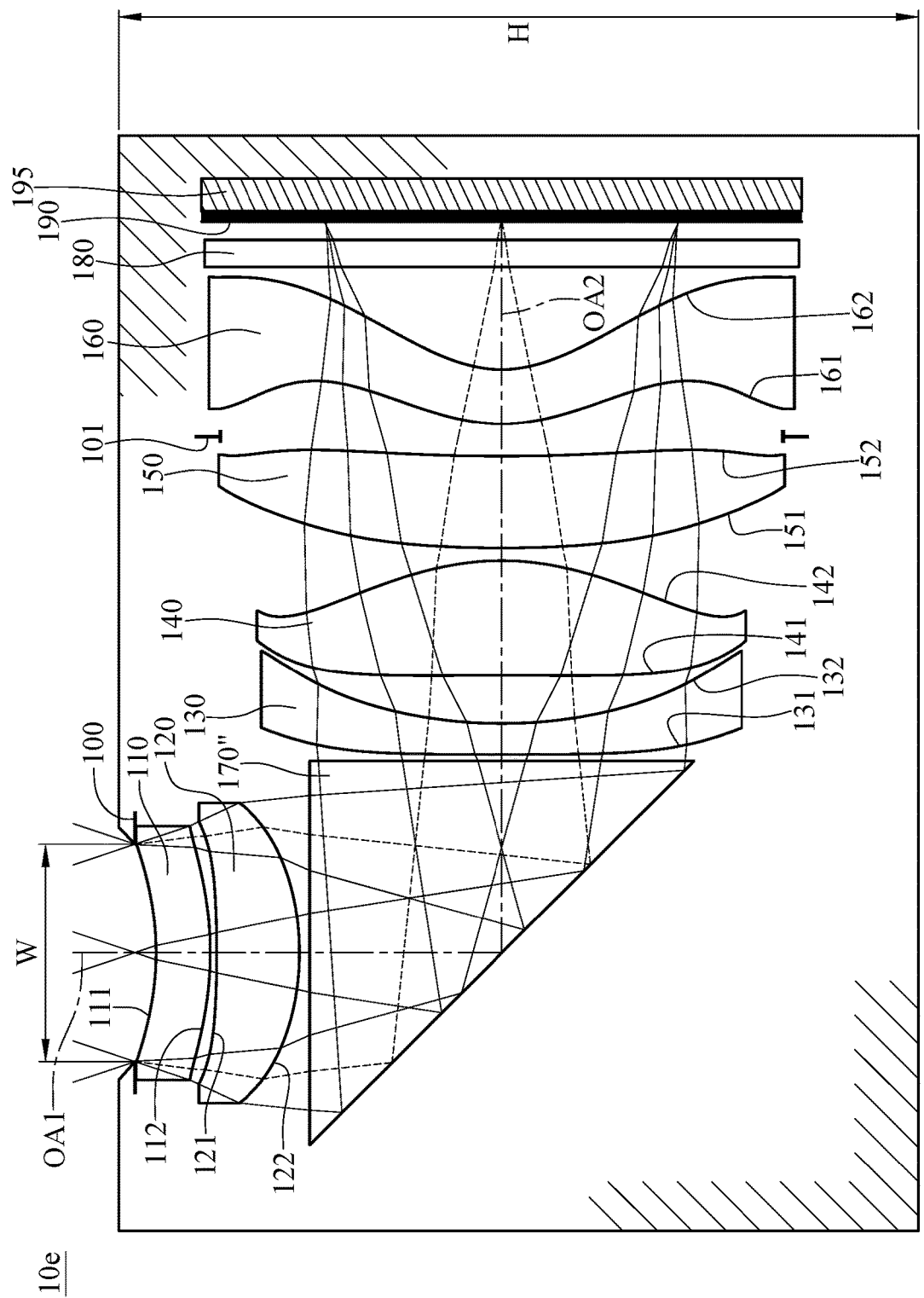
FIG. 23 shows a schematic view of an image capturing unit according to the 9th embodiment of the present disclosure.

According to the present disclosure, an image capturing unit includes the aforementioned imaging optical lens assembly and an image sensor disposed on the image surface of the imaging optical lens assembly, and a height of the image capturing unit can be smaller than 8.0 mm. Therefore, it is favorable for controlling the product's thickness for portability. Please refer to FIG. 23, which shows a schematic view of a height H of an image capturing unit 10e according to the 10th embodiment of the present disclosure. As shown in FIG. 23, the direction of the height H of the image capturing unit 10e is parallel to the first optical axis OA1.

Figure 25:
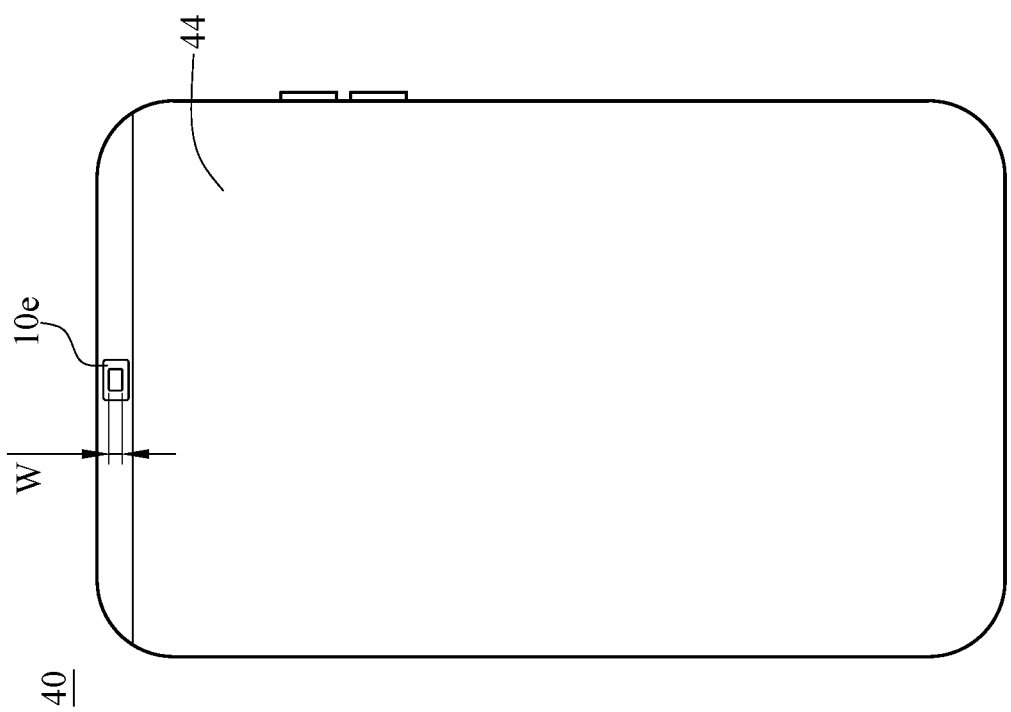
FIG. 25 is one perspective view of an electronic device according to the 11th embodiment of the present disclosure.

According to the present disclosure, an image capturing unit includes the aforementioned imaging optical lens assembly and an image sensor disposed on the image surface of the imaging optical lens assembly, and a short side length of an opening of the image capturing unit can be smaller than 2.500 mm. Therefore, it is favorable for minimizing the appearance of the opening for various applications while satisfying specific product specifications. Moreover, the opening of the image capturing unit can be circular or non-circular. If the opening is circular, said short side length of the opening is the diameter of the circular opening. If the opening is rectangular, said short side length of the opening is the short side length of the rectangular opening. If the opening is in another shape, said short side length of the opening is the short side length of the enclosing rectangle of the opening. Please refer to FIG. 23 and FIG. 25. FIG. 23 shows a schematic view of a short side length W of an opening of the image capturing unit 10e according to the 10th embodiment of the present disclosure, and FIG. 25 shows a front view of the opening of the image capturing unit 10e.

According to the present disclosure, the aforementioned features and conditions can be utilized in numerous combinations so as to achieve corresponding effects.

According to the present disclosure, the lens elements of the imaging optical lens assembly can be made of either glass or plastic material. When the lens elements are made of glass material, the refractive power distribution of the imaging optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing lens assembly can therefore be effectively shortened. Additionally, the aspheric surfaces may be formed by plastic injection molding or glass molding. Moreover, according to the present disclosure, there can be at least one lens element in the imaging optical lens assembly being made of plastic material. Therefore, it is favorable for increasing the flexibility in shape design of the lens elements and the feasibility of mass production. Moreover, the first lens element can be made of plastic material.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the imaging optical lens assembly, based on the corresponding image sensor, can be flat or curved, especially a curved surface being concave facing towards the object side of the imaging optical lens assembly.

According to the present disclosure, an image correction unit, such as a field flattener, can be optionally disposed between the lens element closest to the image side of the imaging optical lens assembly along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the imaging optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens assembly and thereby provides a wider field of view for the same.

According to the present disclosure, the imaging optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
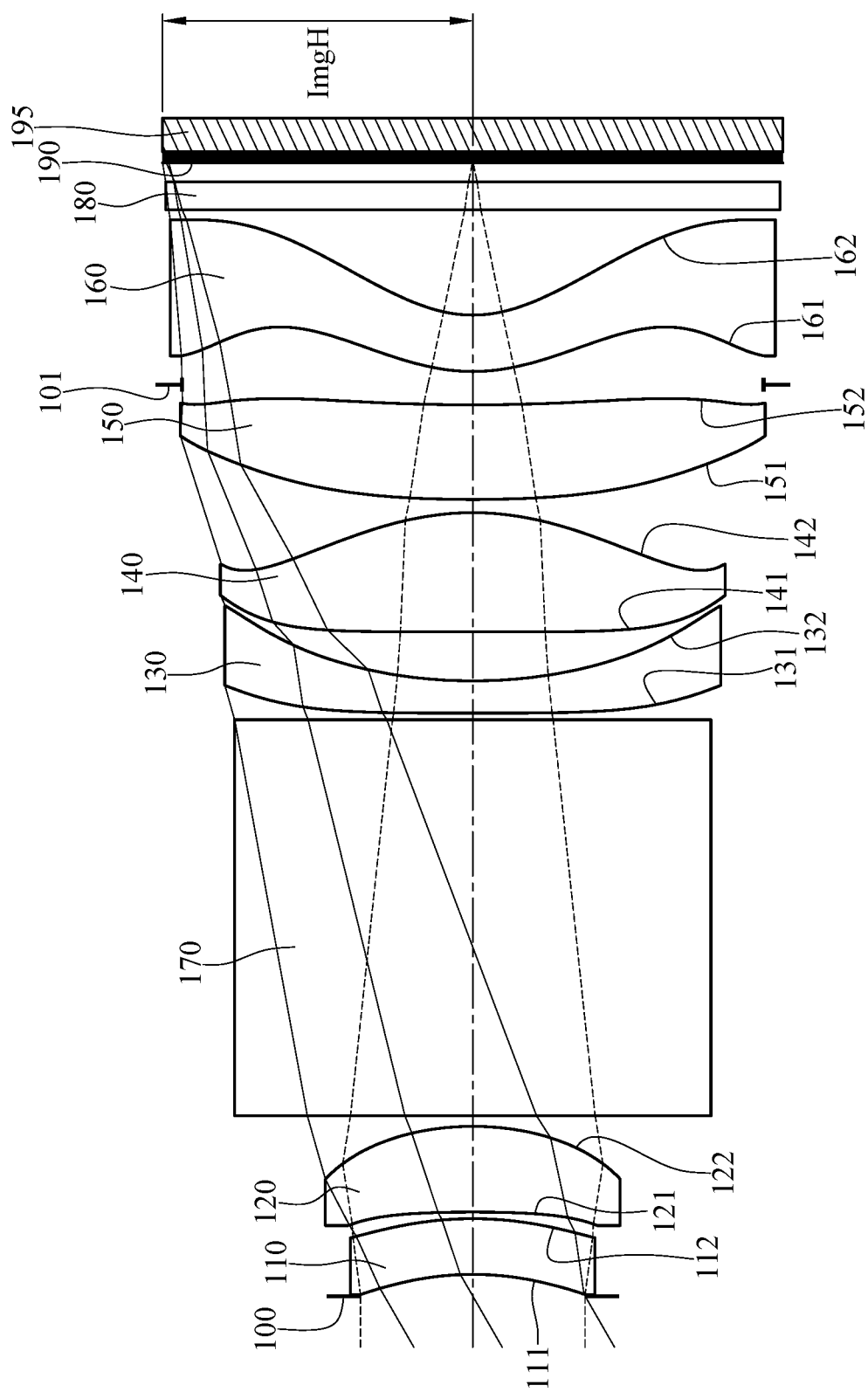
FIG. 1 is a cross-sectional view of an image capturing unit corresponding to a diagonal direction of a photosensitive area of an image sensor according to the 1st embodiment of the present disclosure.
Figure 2:
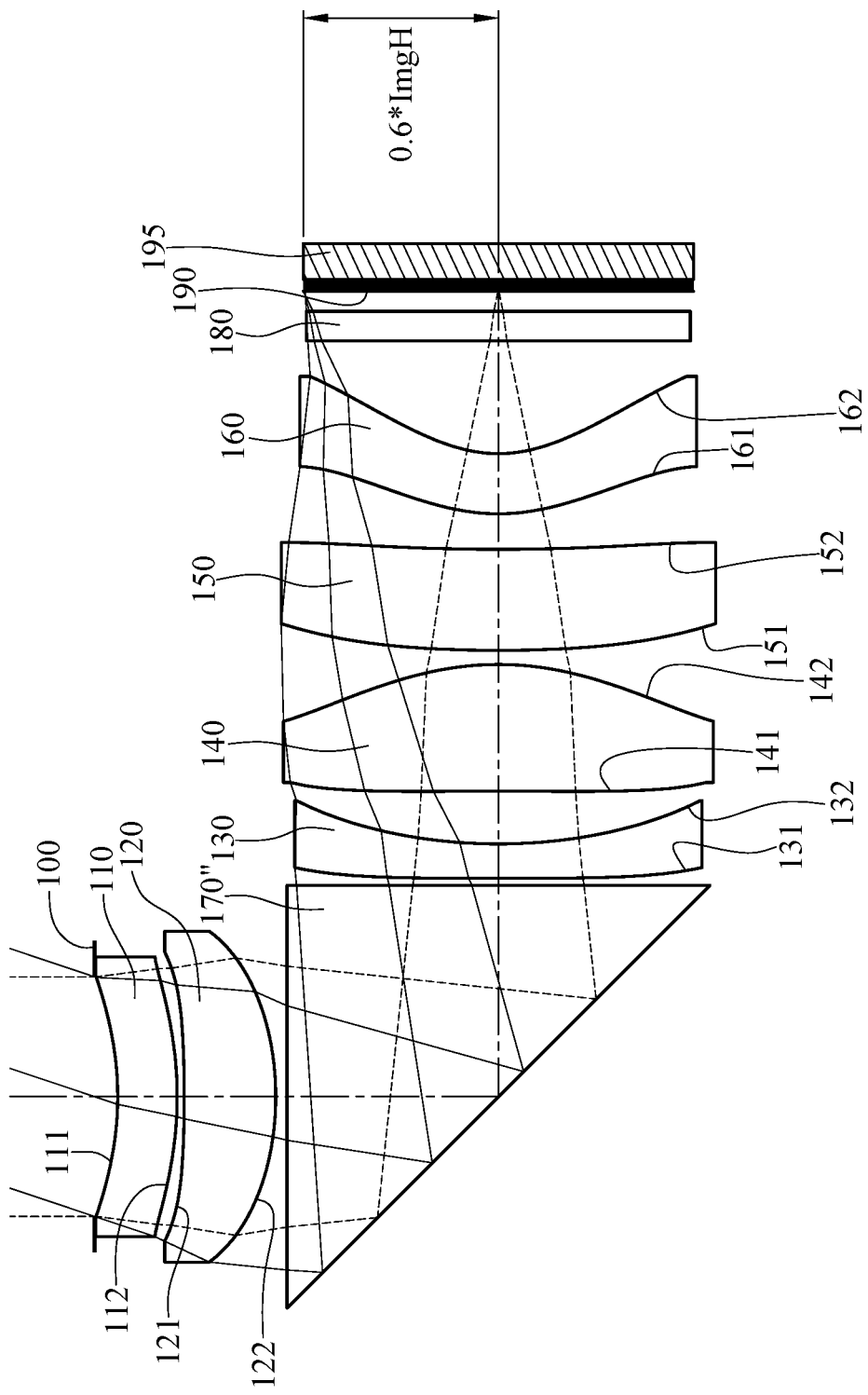
FIG. 2 is a cross-sectional view of the image capturing unit corresponding to a width direction of the photosensitive area of the image sensor with optical path being refracted by a prism according to the 1st embodiment of the present disclosure.
Figure 3:
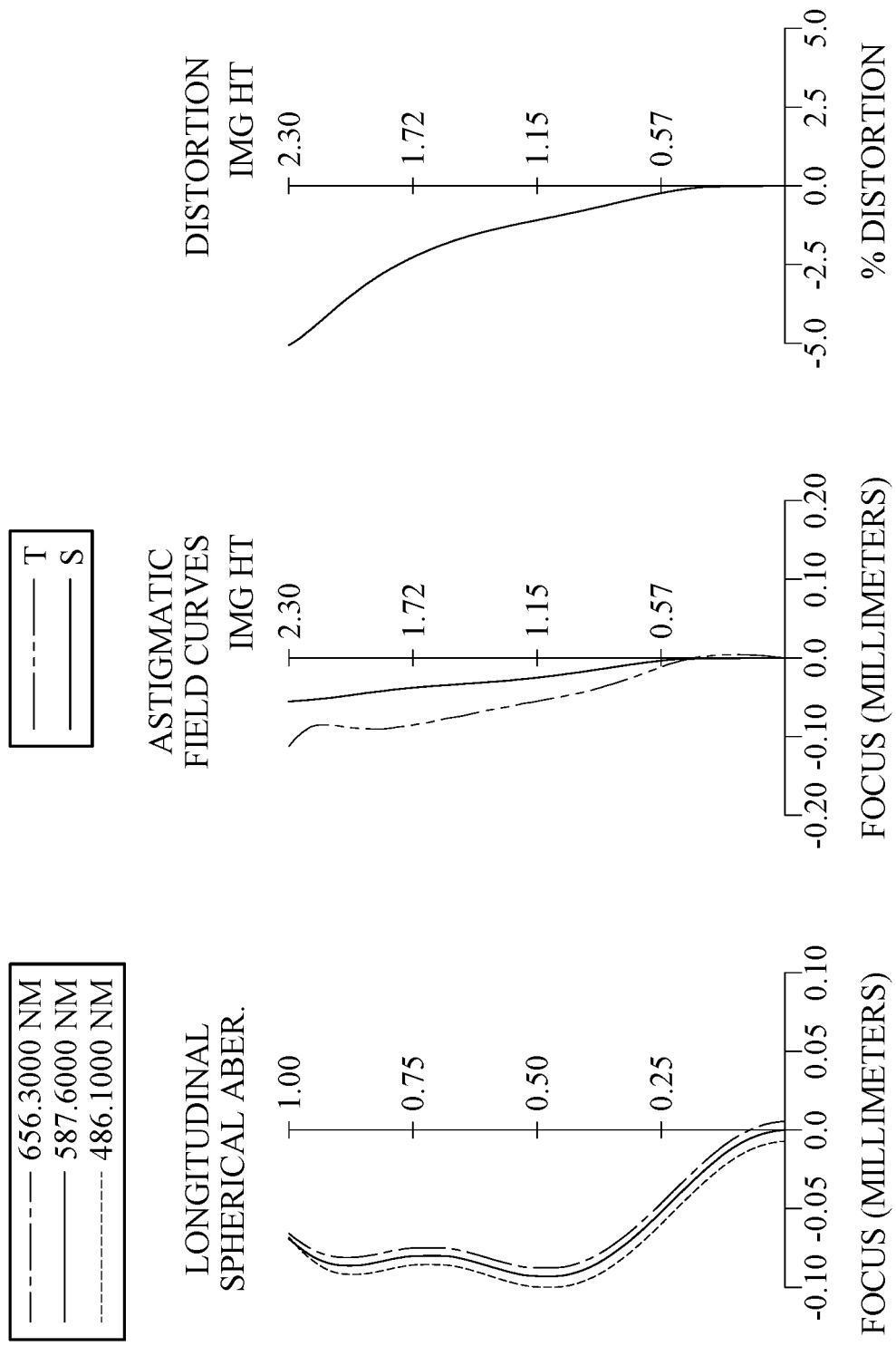
FIG. 3 shows spherical aberration curves, astigmatic field curves and a distortion curve of the image capturing unit according to the 1st embodiment.

FIG. 1 is a cross-sectional view of an image capturing unit corresponding to a diagonal direction of a photosensitive area of an image sensor according to the 1st embodiment of the present disclosure. FIG. 2 is a cross-sectional view of the image capturing unit corresponding to a width direction of the photosensitive area of the image sensor with optical path being refracted by a prism according to the 1st embodiment of the present disclosure. FIG. 3 shows, in order from left to right, spherical aberration curves, astigmatic field curves and a distortion curve of the image capturing unit according to the 1st embodiment. In FIG. 1, the image capturing unit includes the imaging optical lens assembly (its reference numeral is omitted) of the present disclosure and an image sensor 195. The imaging optical lens assembly includes, in order from an object side to an image side along an optical path, an aperture stop 100, a first lens element 110, a second lens element 120, a prism 170, a third lens element 130, a fourth lens element 140, a fifth lens element 150, a stop 101, a sixth lens element 160, a filter 180 and an image surface 190. The imaging optical lens assembly includes six single and non-cemented lens elements (110, 120, 130, 140, 150 and 160) with no additional lens element disposed between each of the adjacent six lens elements, wherein there is an air gap between each of all adjacent lens elements. In FIG. 1, the optical path is not folded. In a different configuration having an optical path of the same length, as shown in FIG. 2, the imaging optical lens assembly is provided with a reflective prism 170" for reflecting incident light, such that the optical path is folded at the reflective prism 170".

The first lens element 110 with negative refractive power has an object-side surface 111 being concave in a paraxial region thereof and an image-side surface 112 being convex in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has at least one inflection point.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has at least one inflection point. The image-side surface 162 of the sixth lens element 160 has at least one inflection point.

The prism 170 (the reflective prism 170") is made of glass material and located between the second lens element 120 and the third lens element 130, and will not affect the focal length of the imaging optical lens assembly. The filter 180 is made of glass material and located between the sixth lens element 160 and the image surface 190, and will not affect the focal length of the imaging optical lens assembly. The image sensor 195 is disposed on or near the image surface 190 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the third lens element 130, the fourth lens element 140, the fifth lens element 150 and the sixth lens element 160 are non-circular lens elements.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is a displacement in parallel with an optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14 and 16.

In the imaging optical lens assembly of the image capturing unit according to the 1st embodiment, when a focal length of the imaging optical lens assembly is f, an f-number of the imaging optical lens assembly is Fno, and half of a maximum field of view of the imaging optical lens assembly is HFOV, these parameters have the following values: f=4.24 millimeters (mm), Fno=2.49, HFOV=30.0 degrees (deg.).

When a refractive index of the prism 170 (the reflective prism 170") is Nr, the following condition is satisfied: Nr=1.517.

When a maximum value among refractive indices of all lens elements of the imaging optical lens assembly is Nmax, the following condition is satisfied: Nmax=1.669. In this embodiment, among the first through sixth lens elements (110, 120, 130, 140, 150 and 160), a refractive index of the first lens element 110 and a refractive index of the third lens element 130 are larger than that of the other lens elements, and Nmax is equal to the refractive index of the first lens element 110 and the refractive index of the third lens element 130.

When a minimum value among Abbe numbers of all lens elements of the imaging optical lens assembly is Vdmin, the following condition is satisfied: Vdmin=19.5. In this embodiment, among the first through sixth lens elements (110, 120, 130, 140, 150 and 160), an Abbe number of the first lens element 110 and an Abbe number of the third lens element 130 are smaller than that of the other lens elements, and Vdmin is equal to the Abbe number of the first lens element 110 and the Abbe number of the third lens element 130.

When the Abbe number of the first lens element 110 is V1, the following condition is satisfied: V1=19.45.

When a central thickness of the first lens element 110 is CT1, and a central thickness of the second lens element 120 is CT2, the following condition is satisfied: CT1/CT2=0.65.

When the central thickness of the first lens element 110 is CT1, and a central thickness of the fourth lens element 140 is CT4, the following condition is satisfied: CT1/CT4=0.47.

When an axial distance between the image-side surface 122 of the second lens element 120 and the object-side surface 131 of the third lens element 130 is Dr4r5, and an axial distance between the third lens element 130 and the fourth lens element 140 is T34, the following condition is satisfied: Dr4r5/T34=8.37. In this embodiment, an axial distance between two adjacent lens elements is a distance in a paraxial region between adjacent lens surfaces of adjacent lens elements.

When the axial distance between the third lens element 130 and the fourth lens element 140 is T34, and an axial distance between the fourth lens element 140 and the fifth lens element 150 is T45, the following condition is satisfied: T34/T45=3.74.

When the axial distance between the image-side surface 122 of the second lens element 120 and the object-side surface 131 of the third lens element 130 is Dr4r5, and a sum of central thicknesses of all lens elements of the imaging optical lens assembly is ΣCT, the following condition is satisfied: Dr4r5/ΣCT=0.93. In this embodiment, ΣCT is the sum of the central thicknesses of the first lens element 110, the second lens element 120, the third lens element 130, the fourth lens element 140, the fifth lens element 150 and the sixth lens element 160.

When the axial distance between the third lens element 130 and the fourth lens element 140 is T34, the axial distance between the fourth lens element 140 and the fifth lens element 150 is T45, and an axial distance between the fifth lens element 150 and the sixth lens element 160 is T56, the following condition is satisfied: T34/(T45+T56)=1.06.

When a curvature radius of the object-side surface 121 of the second lens element 120 is R3, and a curvature radius of the image-side surface 122 of the second lens element 120 is R4, the following condition is satisfied: |R4/R3|=0.21.

When a curvature radius of the object-side surface 141 of the fourth lens element 140 is R7, and a curvature radius of the image-side surface 142 of the fourth lens element 140 is R8, the following condition is satisfied: (R7+R8)/(R7−R8)=1.06.

When the curvature radius of the image-side surface 142 of the fourth lens element 140 is R8, and a curvature radius of the object-side surface 151 of the fifth lens element 150 is R9, the following condition is satisfied: (R8+R9)/(R8−R9)=−0.65.

When the focal length of the imaging optical lens assembly is f, and a focal length of the first lens element 110 is f1, the following condition is satisfied: f/f1=−0.12.

When the focal length of the imaging optical lens assembly is f, and a focal length of the fourth lens element 140 is f4, the following condition is satisfied: f/f4=1.06.

When a maximum effective radius of the object-side surface 111 of the first lens element 110 is Y11, and a curvature radius of the object-side surface 111 of the first lens element 110 is R1, the following condition is satisfied: Y11/R1=−0.39.

When the maximum effective radius of the object-side surface 111 of the first lens element 110 is Y11, and the maximum image height of the imaging optical lens assembly is ImgH, the following condition is satisfied: Y11/ImgH=0.37.

When the maximum image height of the imaging optical lens assembly is ImgH, and the focal length of the imaging optical lens assembly is f, the following condition is satisfied: ImgH/f=0.54.

When an axial distance between the aperture stop 100 and the image surface 190 is SL, an axial distance between the object-side surface 111 of the first lens element 110 and the image surface 190 is TL, the following condition is satisfied: SL/TL=1.02.

When the axial distance between the object-side surface 111 of the first lens element 110 and the image surface 190 is TL, and the focal length of the imaging optical lens assembly is f, the following condition is satisfied: TL/f=1.99.

The detailed optical data of the 1st embodiment are shown in Table 1 and the aspheric surface data are shown in Table 2 below.

TABLE 1

1st Embodiment
f = 4.24 mm, Fno = 2.49, HFOV = 30.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.165 | | | | |
| 2 | Lens 1 | −2.199 | (ASP) | 0.422 | Plastic | 1.669 | 19.5 | −36.14 |
| 3 | | −2.605 | (ASP) | 0.050 | | | | |
| 4 | Lens 2 | −9.923 | (ASP) | 0.649 | Plastic | 1.544 | 56.0 | 4.84 |
| 5 | | −2.128 | (ASP) | 0.080 | | | | |
| 6 | Prism | Plano | | 3.000 | Glass | 1.517 | 64.2 | — |
| 7 | | Plano | | 0.050 | | | | |
| 8 | Lens 3 | 124.212 | (ASP) | 0.244 | Plastic | 1.669 | 19.5 | −5.83 |
| 9 | | 3.780 | (ASP) | 0.374 | | | | |
| 10 | Lens 4 | −67.135 | (ASP) | 0.900 | Plastic | 1.544 | 56.0 | 3.99 |
| 11 | | −2.112 | (ASP) | 0.100 | | | | |
| 12 | Lens 5 | 10.101 | (ASP) | 0.717 | Plastic | 1.544 | 56.0 | 49.51 |
| 13 | | 15.756 | (ASP) | 0.152 | | | | |
| 14 | Stop | Plano | | 0.100 | | | | |
| 15 | Lens 6 | 1.411 | (ASP) | 0.427 | Plastic | 1.544 | 56.0 | −7.86 |
| 16 | | 0.947 | (ASP) | 0.800 | | | | |
| 17 | Filter | Plano | | 0.210 | Glass | 1.517 | 64.2 | — |
| 18 | | Plano | | 0.143 | | | | |
| 19 | Image | Plano | | — | | | | |

Note:
Reference wavelength is 587.6 nm (d-line).
An effective radius of the stop 101 (Surface 14) is 2.200 mm.

TABLE 2

Aspheric Coefficients

| Surface # | 2 | 3 | 4 | 5 | 8 | 9 |
|---|---|---|---|---|---|---|
| k = | −2.7875E+00 | −2.5155E+00 | −2.7353E+01 | 1.7548E+00 | −2.0868E+01 | 2.1162E−01 |
| A4 = | 1.3630E−02 | 1.3230E−02 | −4.3632E−02 | −1.1037E−02 | 1.0411E−02 | 9.7257E−04 |
| A6 = | −4.2755E−02 | 1.1695E−02 | −3.9973E−02 | 1.4505E−02 | 3.1410E−03 | 1.8995E−03 |
| A8 = | 5.8431E−02 | −3.4550E−02 | 1.5447E−02 | −1.3210E−02 | −6.5062E−06 | 2.6684E−04 |
| A10 = | −3.1987E−02 | 1.9113E−02 | −1.4536E−02 | 1.6267E−03 | −1.3839E−04 | −5.5576E−06 |
| A12 = | −4.8458E−04 | 4.8271E−03 | −1.2300E−02 | 2.4045E−03 | −1.6640E−05 | −2.0597E−05 |
| A14 = | 1.0551E−02 | 8.3310E−03 | 1.6333E−02 | −3.3472E−04 | 5.5775E−06 | −4.5191E−06 |

| Surface # | 10 | 11 | 12 | 13 | 15 | 16 |
|---|---|---|---|---|---|---|
| k = | 5.0000E+01 | −2.0444E+00 | 6.5371E+00 | 4.3364E+01 | −4.1170E+00 | −2.7280E+00 |
| A4 = | 1.1730E−02 | 9.7136E−03 | 1.4746E−02 | 1.7240E−04 | −1.2635E−02 | 2.2467E−03 |
| A6 = | 6.3740E−04 | 2.2403E−03 | −9.1109E−04 | −3.0224E−03 | −1.1780E−02 | −1.9446E−02 |
| A8 = | 4.7003E−04 | −3.1361E−05 | −1.2335E−04 | 3.6607E−05 | 1.7069E−04 | 5.5095E−03 |

TABLE 2-continued

| Aspheric Coefficients | | | | | | |
|---|---|---|---|---|---|---|
| A10 = | 1.4460E−04 | 4.0269E−05 | −1.9364E−05 | −8.5538E−06 | 3.3851E−04 | −5.6460E−04 |
| A12 = | 9.0381E−06 | 1.3392E−05 | 3.5043E−08 | −1.2851E−06 | 2.0124E−05 | −1.1856E−05 |
| A14 = | −9.6575E−06 | 6.3801E−06 | 1.3424E−06 | 2.3409E−06 | −6.0183E−06 | 4.6583E−06 |
| A16 = | — | — | — | — | 1.4608E−09 | −1.4873E−09 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 4:
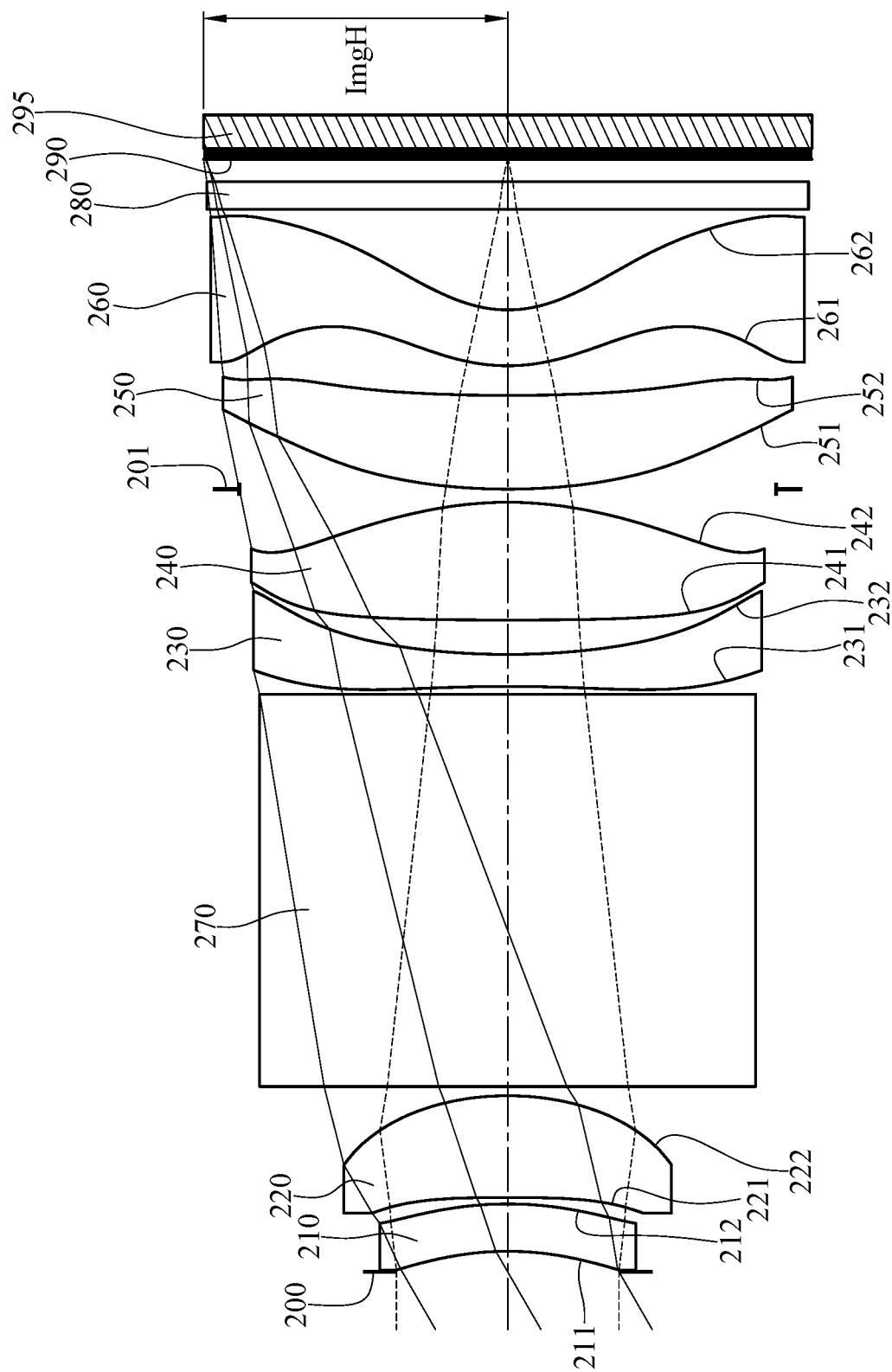
FIG. 4 is a cross-sectional view of an image capturing unit corresponding to a diagonal direction of a photosensitive area of an image sensor according to the 2nd embodiment of the present disclosure.
Figure 5:
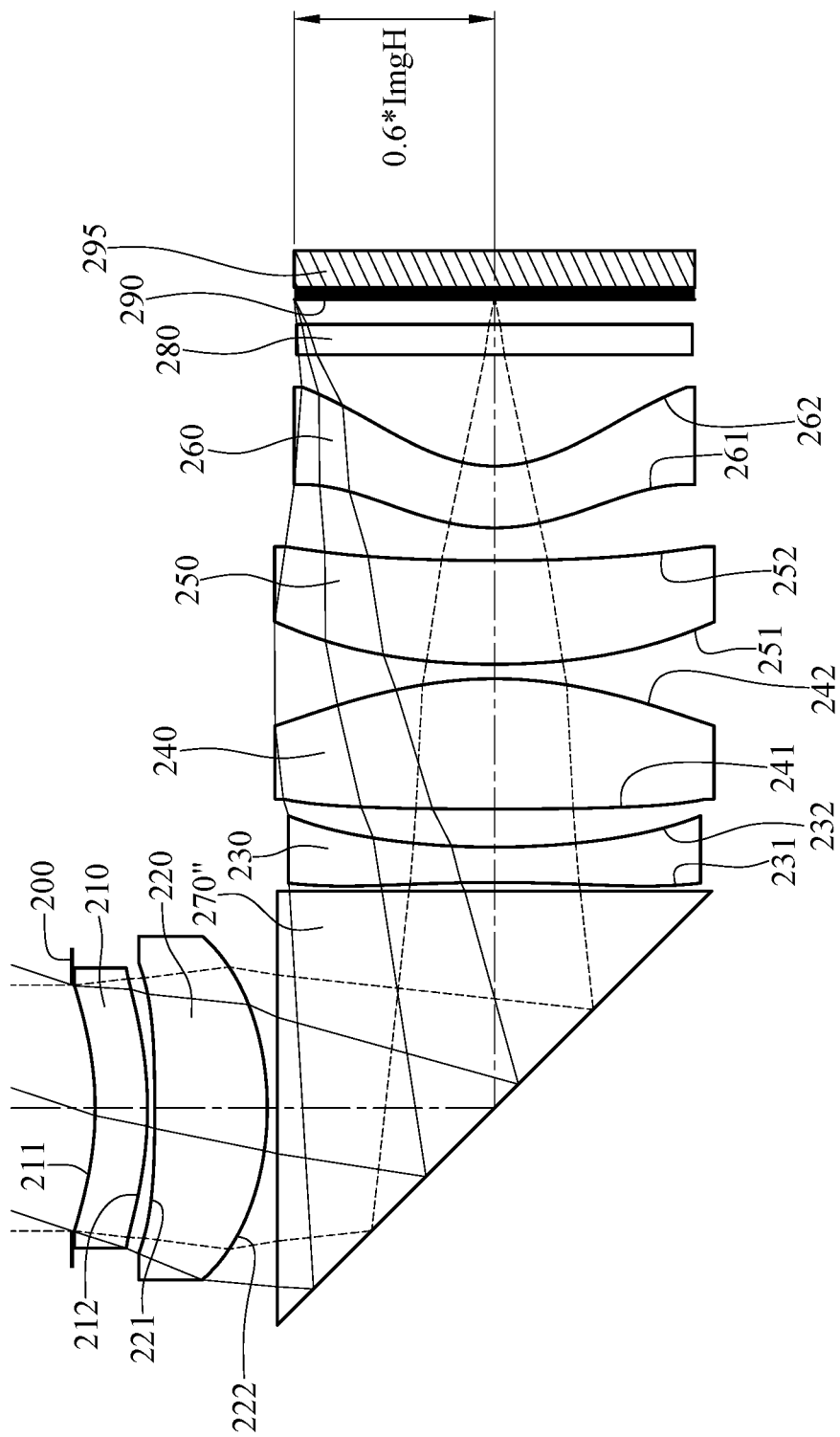
FIG. 5 is a cross-sectional view of the image capturing unit corresponding to a width direction of the photosensitive area of the image sensor with optical path being refracted by a prism according to the 2nd embodiment of the present disclosure.
Figure 6:
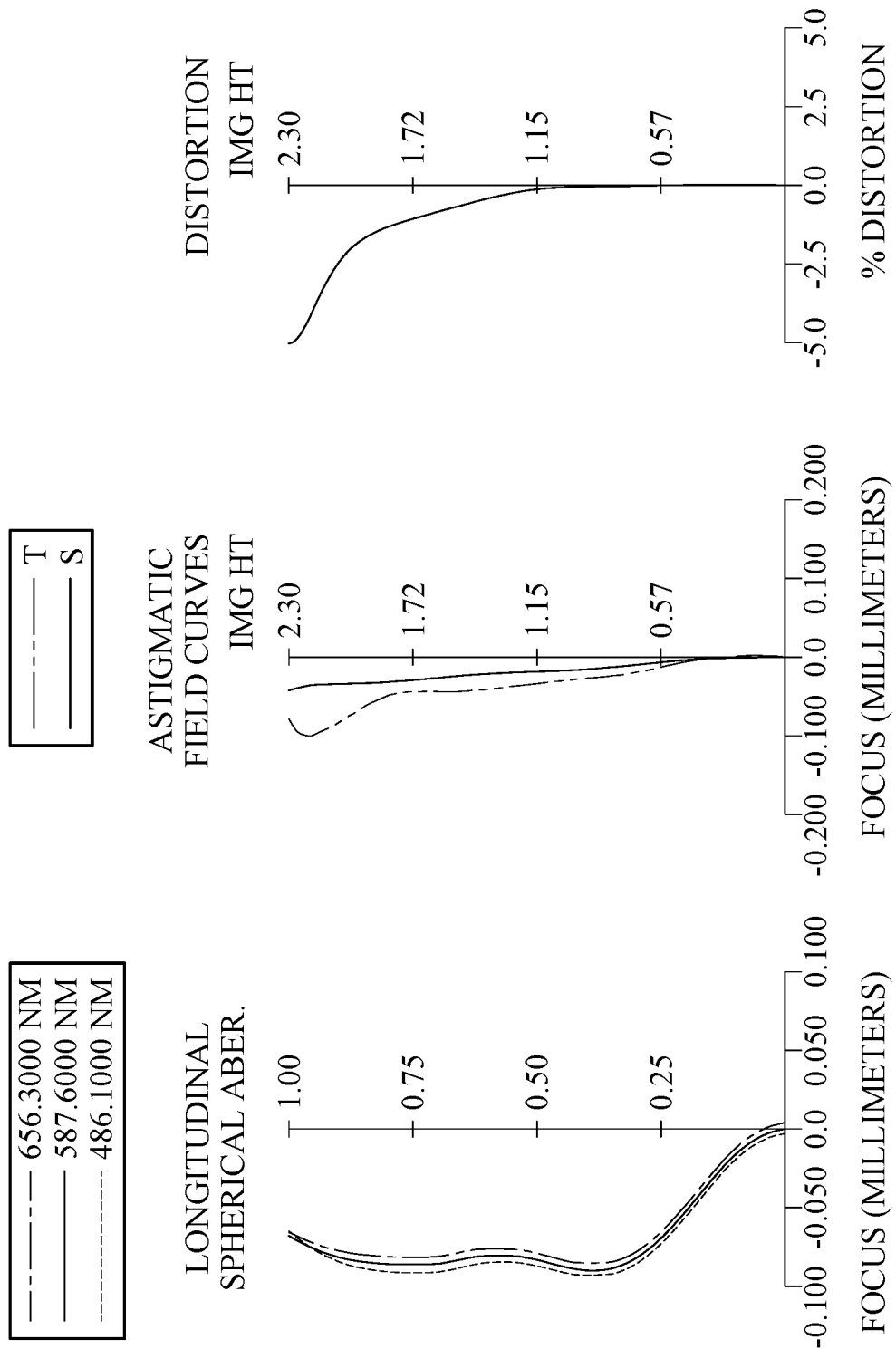
FIG. 6 shows spherical aberration curves, astigmatic field curves and a distortion curve of the image capturing unit according to the 2nd embodiment.

FIG. 4 is a cross-sectional view of an image capturing unit corresponding to a diagonal direction of a photosensitive area of an image sensor according to the 2nd embodiment of the present disclosure. FIG. 5 is a cross-sectional view of the image capturing unit corresponding to a width direction of the photosensitive area of the image sensor with optical path being refracted by a prism according to the 2nd embodiment of the present disclosure. FIG. 6 shows, in order from left to right, spherical aberration curves, astigmatic field curves and a distortion curve of the image capturing unit according to the 2nd embodiment. In FIG. 4, the image capturing unit includes the imaging optical lens assembly (its reference numeral is omitted) of the present disclosure and an image sensor 295. The imaging optical lens assembly includes, in order from an object side to an image side along an optical path, an aperture stop 200, a first lens element 210, a second lens element 220, a prism 270, a third lens element 230, a fourth lens element 240, a stop 201, a fifth lens element 250, a sixth lens element 260, a filter 280 and an image surface 290. The imaging optical lens assembly includes six single and non-cemented lens elements (210, 220, 230, 240, 250 and 260) with no additional lens element disposed between each of the adjacent six lens elements, wherein there is an air gap between each of all adjacent lens elements. In FIG. 4, the optical path is not folded. In a different configuration having an optical path of the same length, as shown in FIG. 5, the imaging optical lens assembly is provided with a reflective prism 270" for reflecting incident light, such that the optical path is folded at the reflective prism 270".

The first lens element 210 with negative refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has at least one inflection point.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has at least one inflection point. The image-side surface 262 of the sixth lens element 260 has at least one inflection point.

The prism 270 (the reflective prism 270") is made of glass material and located between the second lens element 220 and the third lens element 230, and will not affect the focal length of the imaging optical lens assembly. The filter 280 is made of glass material and located between the sixth lens element 260 and the image surface 290, and will not affect the focal length of the imaging optical lens assembly. The image sensor 295 is disposed on or near the image surface 290 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the third lens element 230, the fourth lens element 240, the fifth lens element 250 and the sixth lens element 260 are non-circular lens elements.

The detailed optical data of the 2nd embodiment are shown in Table 3 and the aspheric surface data are shown in Table 4 below.

TABLE 3

2nd Embodiment
f = 4.24 mm, Fno = 2.49, HFOV = 30.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.158 | | | | |
| 2 | Lens 1 | −2.258 | (ASP) | 0.362 | Plastic | 1.669 | 19.5 | −36.73 |
| 3 | | −2.646 | (ASP) | 0.050 | | | | |
| 4 | Lens 2 | −12.373 | (ASP) | 0.777 | Plastic | 1.544 | 56.0 | 4.73 |
| 5 | | −2.176 | (ASP) | 0.070 | | | | |
| 6 | Prism | Plano | | 3.000 | Glass | 1.517 | 64.2 | — |
| 7 | | Plano | | 0.060 | | | | |
| 8 | Lens 3 | −11.403 | (ASP) | 0.244 | Plastic | 1.679 | 18.4 | −5.61 |
| 9 | | 5.773 | (ASP) | 0.264 | | | | |
| 10 | Lens 4 | 100.000 | (ASP) | 0.900 | Plastic | 1.544 | 56.0 | 5.08 |
| 11 | | −2.831 | (ASP) | 0.100 | | | | |
| 12 | Stop | Plano | | 0.000 | | | | |
| 13 | Lens 5 | 4.932 | (ASP) | 0.717 | Plastic | 1.529 | 45.4 | 13.36 |
| 14 | | 15.476 | (ASP) | 0.226 | | | | |
| 15 | Lens 6 | 1.388 | (ASP) | 0.427 | Plastic | 1.544 | 56.0 | −8.05 |
| 16 | | 0.940 | (ASP) | 0.770 | | | | |
| 17 | Filter | Plano | | 0.210 | Glass | 1.517 | 64.2 | — |
| 18 | | Plano | | 0.172 | | | | |
| 19 | Image | Plano | | — | | | | |

Note:
Reference wavelength is 587.6 nm (d-line).
An effective radius of the stop 201 (Surface 12) is 2.050 mm.

TABLE 4

Aspheric Coefficients

| Surface # | 2 | 3 | 4 | 5 | 8 | 9 |
|---|---|---|---|---|---|---|
| k = | −2.9528E+00 | −2.7735E+00 | −1.5219E+01 | 1.5716E+00 | −5.0000E+01 | 1.3725E+00 |
| A4 = | 5.2869E−02 | 4.3199E−02 | −1.5678E−02 | −9.0889E−03 | 1.2411E−02 | 1.8229E−03 |
| A6 = | −2.9990E−01 | −1.4586E−01 | −2.0138E−01 | 9.3024E−03 | 3.0994E−03 | 2.6786E−03 |
| A8 = | 9.7360E−01 | 2.4919E−01 | 3.4801E−01 | −2.0912E−02 | −4.8600E−06 | 4.0338E−04 |
| A10 = | −1.6956E+00 | −1.4412E−01 | −2.9834E−01 | 2.4729E−02 | −1.1679E−04 | 1.1609E−05 |
| A12 = | 1.5204E+00 | −2.7818E−02 | 8.6987E−02 | −1.4313E−02 | −1.5201E−05 | −2.0121E−05 |
| A14 = | −5.4153E−01 | 5.3747E−02 | 1.1345E−02 | 3.4058E−03 | 4.0862E−06 | −6.3483E−06 |

| Surface # | 10 | 11 | 13 | 14 | 15 | 16 |
|---|---|---|---|---|---|---|
| k = | −1.0000E+00 | −1.5043E+00 | 1.9893E+00 | 4.3122E+01 | −3.9592E+00 | −2.5703E+00 |
| A4 = | 2.3761E−02 | 3.2358E−02 | 1.7215E−02 | 8.9721E−03 | 3.2468E−02 | 7.1476E−02 |
| A6 = | −2.2344E−02 | −3.0663E−02 | −1.7470E−02 | −1.1945E−02 | −9.3888E−02 | −1.4270E−01 |
| A8 = | 1.4925E−02 | 2.0591E−02 | 1.5491E−02 | 1.3762E−02 | 4.0096E−02 | 8.8349E−02 |
| A10 = | −4.8454E−03 | −7.8009E−03 | −6.6235E−03 | −6.5331E−03 | −6.1980E−03 | −3.0639E−02 |
| A12 = | 9.3850E−04 | 1.6023E−03 | 1.2516E−03 | 1.2340E−03 | −3.9686E−04 | 6.3595E−03 |
| A14 = | −8.3296E−05 | −1.2635E−04 | −8.6860E−05 | −8.0429E−05 | 2.2195E−04 | −7.3727E−04 |
| A16 = | — | — | — | — | −1.7361E−05 | 3.6451E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 4.24 | T34/(T45 + T56) | 0.81 |
| Fno | 2.49 | |R4/R3| | 0.18 |
| HFOV [deg.] | 30.0 | (R7 + R8)/(R7 − R8) | 0.94 |
| Nr | 1.517 | (R8 + R9)/(R8 − R9) | −0.27 |
| Nmax | 1.679 | f/f1 | −0.12 |
| Vdmin | 18.4 | f/f4 | 0.83 |
| V1 | 19.45 | Y11/R1 | −0.38 |
| CT1/CT2 | 0.47 | Y11/ImgH | 0.37 |
| CT1/CT4 | 0.40 | ImgH/f | 0.54 |
| Dr4r5/T34 | 11.86 | SL/TL | 1.02 |
| T34/T45 | 2.64 | TL/f | 1.97 |
| Dr4r5/ΣCT | 0.91 | — | — |

3rd Embodiment

Figure 7:
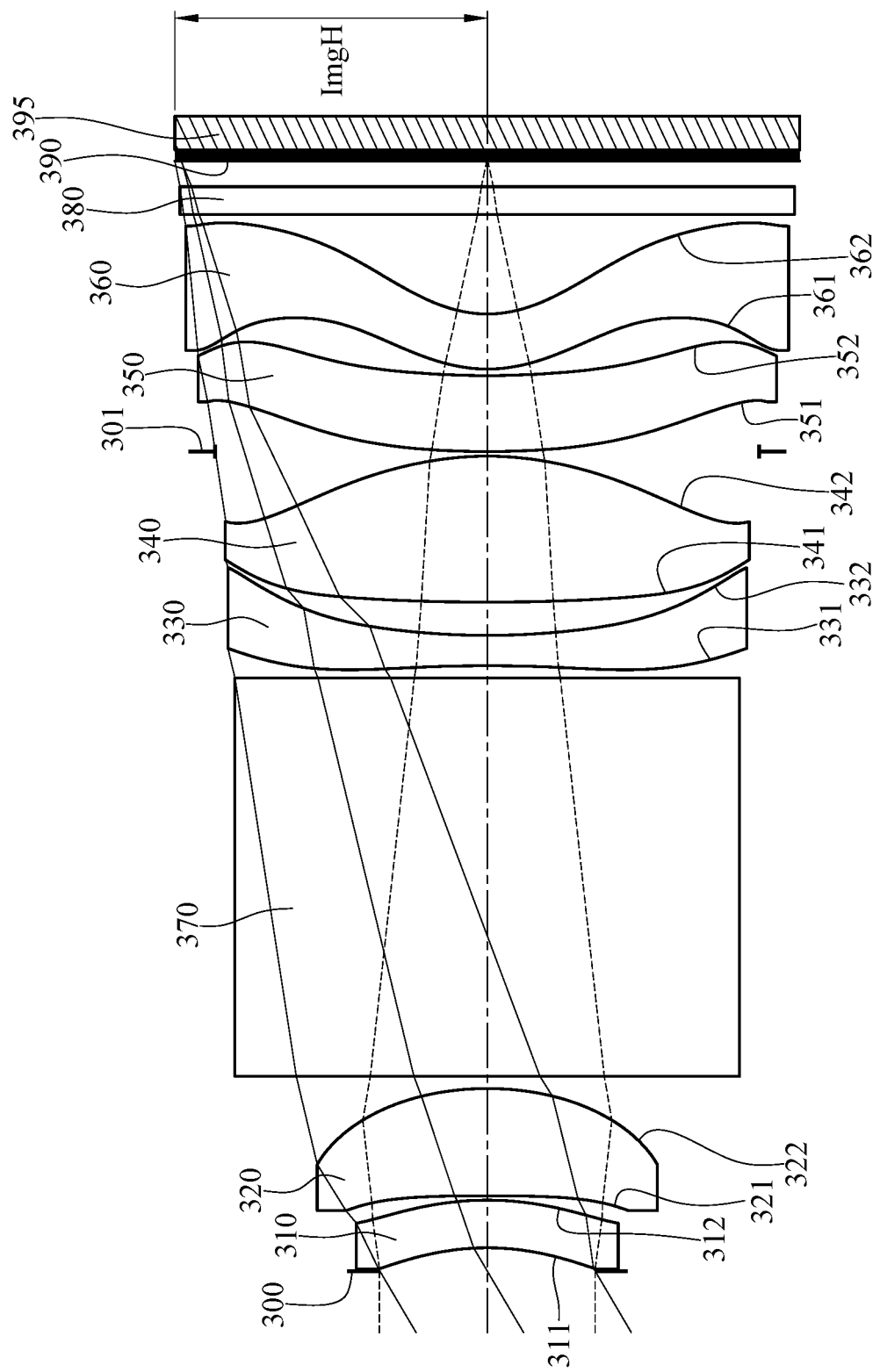
FIG. 7 is a cross-sectional view of an image capturing unit corresponding to a diagonal direction of a photosensitive area of an image sensor according to the 3rd embodiment of the present disclosure.
Figure 8:
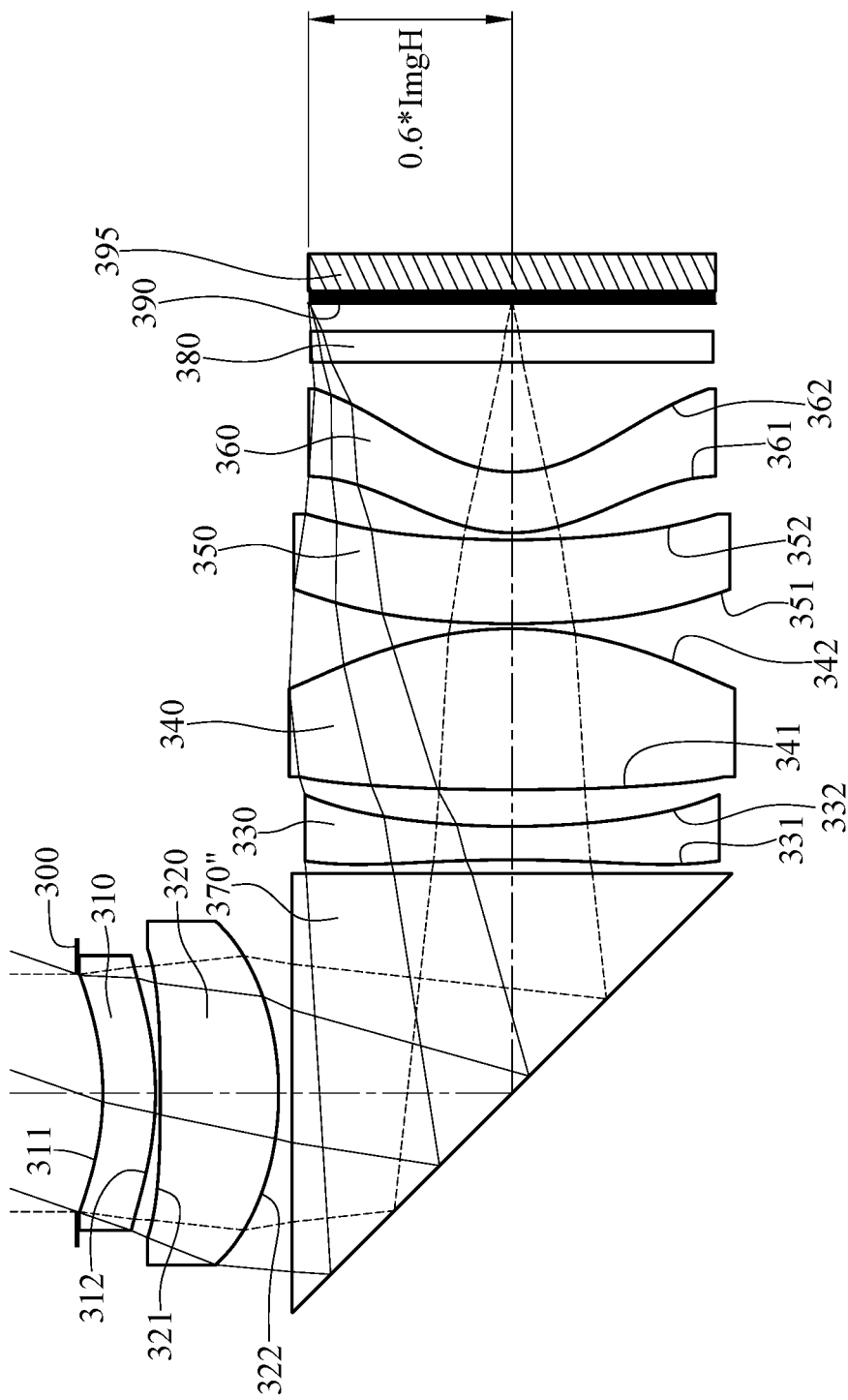
FIG. 8 is a cross-sectional view of the image capturing unit corresponding to a width direction of the photosensitive area of the image sensor with optical path being refracted by a prism according to the 3rd embodiment of the present disclosure.
Figure 9:
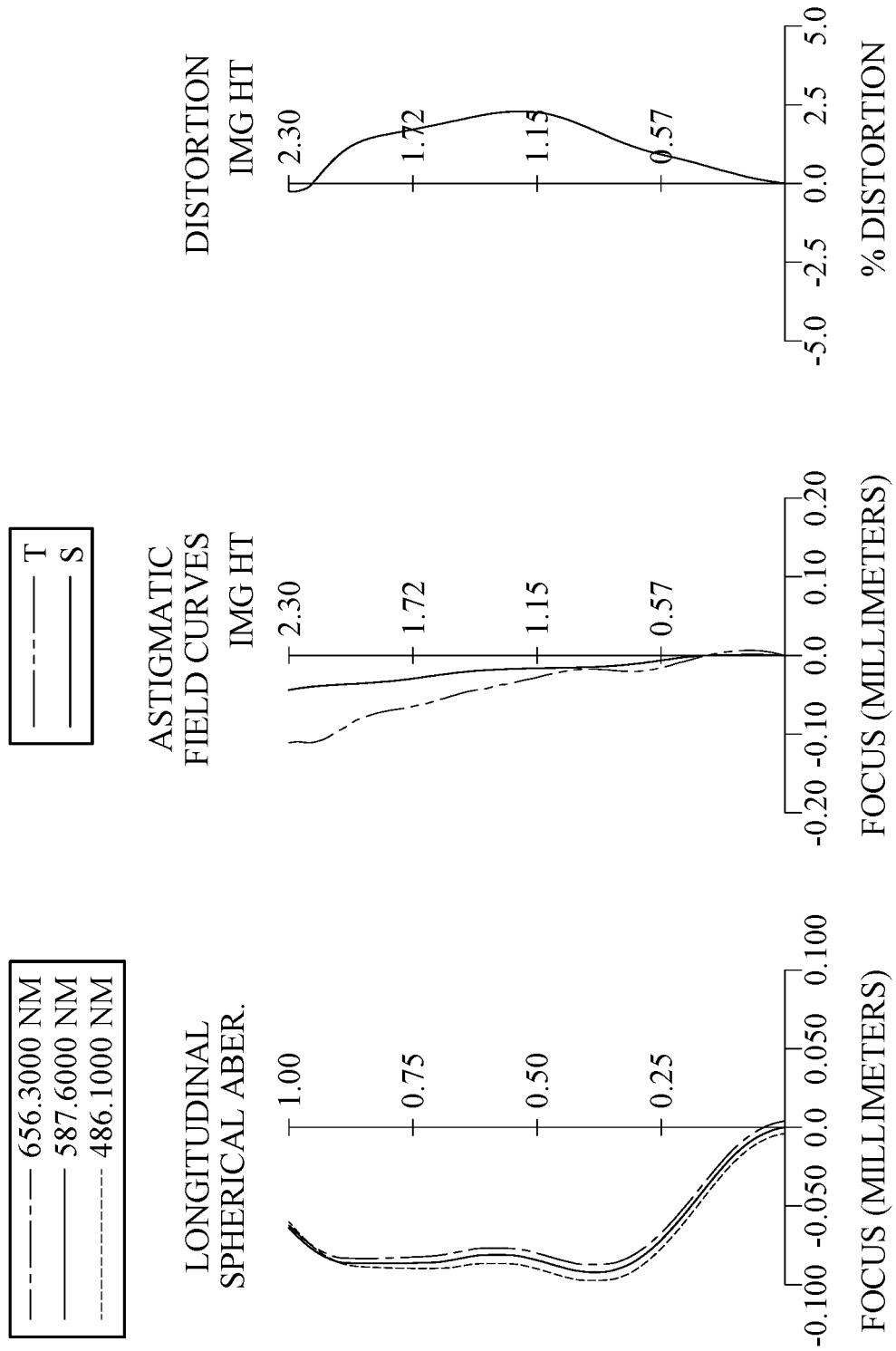
FIG. 9 shows spherical aberration curves, astigmatic field curves and a distortion curve of the image capturing unit according to the 3rd embodiment.

FIG. 7 is a cross-sectional view of an image capturing unit corresponding to a diagonal direction of a photosensitive area of an image sensor according to the 3rd embodiment of the present disclosure. FIG. 8 is a cross-sectional view of the image capturing unit corresponding to a width direction of the photosensitive area of the image sensor with optical path being refracted by a prism according to the 3rd embodiment of the present disclosure. FIG. 9 shows, in order from left to right, spherical aberration curves, astigmatic field curves and a distortion curve of the image capturing unit according to the 3rd embodiment. In FIG. 7, the image capturing unit includes the imaging optical lens assembly (its reference numeral is omitted) of the present disclosure and an image sensor 395. The imaging optical lens assembly includes, in order from an object side to an image side along an optical path, an aperture stop 300, a first lens element 310, a second lens element 320, a prism 370, a third lens element 330, a fourth lens element 340, a stop 301, a fifth lens element 350, a sixth lens element 360, a filter 380 and an image surface 390. The imaging optical lens assembly includes six single and non-cemented lens elements (310, 320, 330, 340, 350 and 360) with no additional lens element disposed between each of the adjacent six lens elements, wherein there is an air gap between each of all adjacent lens elements. In FIG. 7, the optical path is not folded. In a different configuration having an optical path of the same length, as shown in FIG. 8, the imaging optical lens assembly is provided with a reflective prism 370" for reflecting incident light, such that the optical path is folded at the reflective prism 370".

The first lens element 310 with negative refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has at least one inflection point.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has at least one inflection point. The image-side surface 362 of the sixth lens element 360 has at least one inflection point.

The prism 370 (the reflective prism 370") is made of glass material and located between the second lens element 320 and the third lens element 330, and will not affect the focal length of the imaging optical lens assembly. The filter 380 is made of glass material and located between the sixth lens element 360 and the image surface 390, and will not affect the focal length of the imaging optical lens assembly. The image sensor 395 is disposed on or near the image surface 390 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the third lens element 330, the fourth lens element 340, the fifth lens element 350 and the sixth lens element 360 are non-circular lens elements.

The detailed optical data of the 3rd embodiment are shown in Table 5 and the aspheric surface data are shown in Table 6 below.

TABLE 5

3rd Embodiment
f = 3.96 mm, Fno = 2.44, HFOV = 30.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.175 | | | | |
| 2 | Lens 1 | −1.871 | (ASP) | 0.359 | Plastic | 1.669 | 19.5 | −26.38 |
| 3 | | −2.254 | (ASP) | 0.033 | | | | |
| 4 | Lens 2 | −21.112 | (ASP) | 0.808 | Plastic | 1.544 | 56.0 | 4.41 |
| 5 | | −2.182 | (ASP) | 0.093 | | | | |
| 6 | Prism | Plano | | 3.000 | Glass | 1.517 | 64.2 | — |
| 7 | | Plano | | 0.093 | | | | |
| 8 | Lens 3 | −11.106 | (ASP) | 0.229 | Plastic | 1.679 | 18.4 | −5.59 |
| 9 | | 5.823 | (ASP) | 0.251 | | | | |
| 10 | Lens 4 | 33.423 | (ASP) | 1.099 | Plastic | 1.544 | 56.0 | 4.17 |
| 11 | | −2.406 | (ASP) | 0.035 | | | | |
| 12 | Stop | Plano | | 0.000 | | | | |
| 13 | Lens 5 | 7.003 | (ASP) | 0.572 | Plastic | 1.529 | 45.4 | −212.69 |
| 14 | | 6.406 | (ASP) | 0.049 | | | | |
| 15 | Lens 6 | 1.122 | (ASP) | 0.415 | Plastic | 1.544 | 56.0 | −23.69 |
| 16 | | 0.898 | (ASP) | 0.750 | | | | |

TABLE 5-continued

3rd Embodiment
f = 3.96 mm, Fno = 2.44, HFOV = 30.5 deg.

| Surface # | | Curvature Radius | Thickness | Material | Index | Abbe # | Focal Length |
|---|---|---|---|---|---|---|---|
| 17 | Filter | Plano | 0.210 | Glass | 1.517 | 64.2 | — |
| 18 | | Plano | 0.193 | | | | |
| 19 | Image | Plano | — | | | | |

Note:
Reference wavelength is 587.6 nm (d-line).
An effective radius of the stop 301 (Surface 12) is 2.047 mm.

TABLE 6

| Aspheric Coefficients | | | | | | |
|---|---|---|---|---|---|---|
| Surface # | 2 | 3 | 4 | 5 | 8 | 9 |
| k = | −2.8625E+00 | −2.9236E+00 | −1.5219E+01 | 1.5673E+00 | −4.8609E+01 | 2.5244E+00 |
| A4 = | 5.2662E−02 | 1.1749E−02 | −4.3865E−02 | −1.3186E−02 | −1.2248E−02 | −5.4202E−03 |
| A6 = | −3.5147E−01 | −1.7501E−02 | −1.0170E−01 | 2.3390E−02 | 3.5292E−02 | 8.1373E−04 |
| A8 = | 1.2390E+00 | −7.1655E−02 | 1.8958E−01 | −4.4292E−02 | −1.5759E−02 | 1.1452E−02 |
| A10 = | −2.3180E+00 | 4.2201E−01 | −9.5213E−02 | 4.9984E−02 | 3.4061E−03 | −6.7095E−03 |
| A12 = | 2.2471E+00 | −5.6964E−01 | −7.9106E−02 | −2.8195E−02 | −3.3242E−04 | 1.5381E−03 |
| A14 = | −8.7675E−01 | 2.5473E−01 | 6.3192E−02 | 6.1319E−03 | 7.9630E−06 | −1.3337E−04 |
| Surface # | 10 | 11 | 13 | 14 | 15 | 16 |
| k = | −1.0000E+00 | −1.2647E+00 | −5.7981E−04 | −1.4833E+01 | −3.1852E+00 | −1.9700E+00 |
| A4 = | 5.5139E−02 | 3.2134E−02 | 2.7267E−02 | −2.2195E−02 | 4.6513E−02 | 4.1464E−02 |
| A6 = | −7.5180E−02 | −3.0073E−02 | −1.5135E−02 | 4.7035E−02 | −1.0862E−01 | −1.4130E−01 |
| A8 = | 5.0484E−02 | 1.4294E−02 | 1.2549E−02 | −2.4240E−02 | 3.4908E−02 | 8.8351E−02 |
| A10 = | −1.6518E−02 | −2.8103E−03 | −5.9933E−03 | 5.9197E−03 | 3.6228E−03 | −2.9061E−02 |
| A12 = | 2.7576E−03 | 2.1815E−04 | 1.2665E−03 | −8.2902E−04 | −4.2085E−03 | 5.6303E−03 |
| A14 = | −1.8917E−04 | 3.0817E−06 | −1.0001E−04 | 5.2622E−05 | 8.2082E−04 | −6.1558E−04 |
| A16 = | — | — | — | — | −5.1276E−05 | 2.9378E−05 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.96 | T34/(T45 + T56) | 2.99 |
| Fno | 2.44 | |R4/R3| | 0.10 |
| HFOV [deg.] | 30.5 | (R7 + R8)/(R7 − R8) | 0.87 |
| Nr | 1.517 | (R8 + R9)/(R8 − R9) | −0.49 |
| Nmax | 1.679 | f/f1 | −0.15 |
| Vdmin | 18.4 | f/f4 | 0.95 |
| V1 | 19.45 | Y11/R1 | −0.44 |
| CT1/CT2 | 0.44 | Y11/ImgH | 0.36 |
| CT1/CT4 | 0.33 | ImgH/f | 0.58 |
| Dr4r5/T34 | 12.69 | SL/TL | 1.02 |
| T34/T45 | 7.17 | TL/f | 2.07 |
| Dr4r5/ΣCT | 0.91 | | |

4th Embodiment

Figure 10:
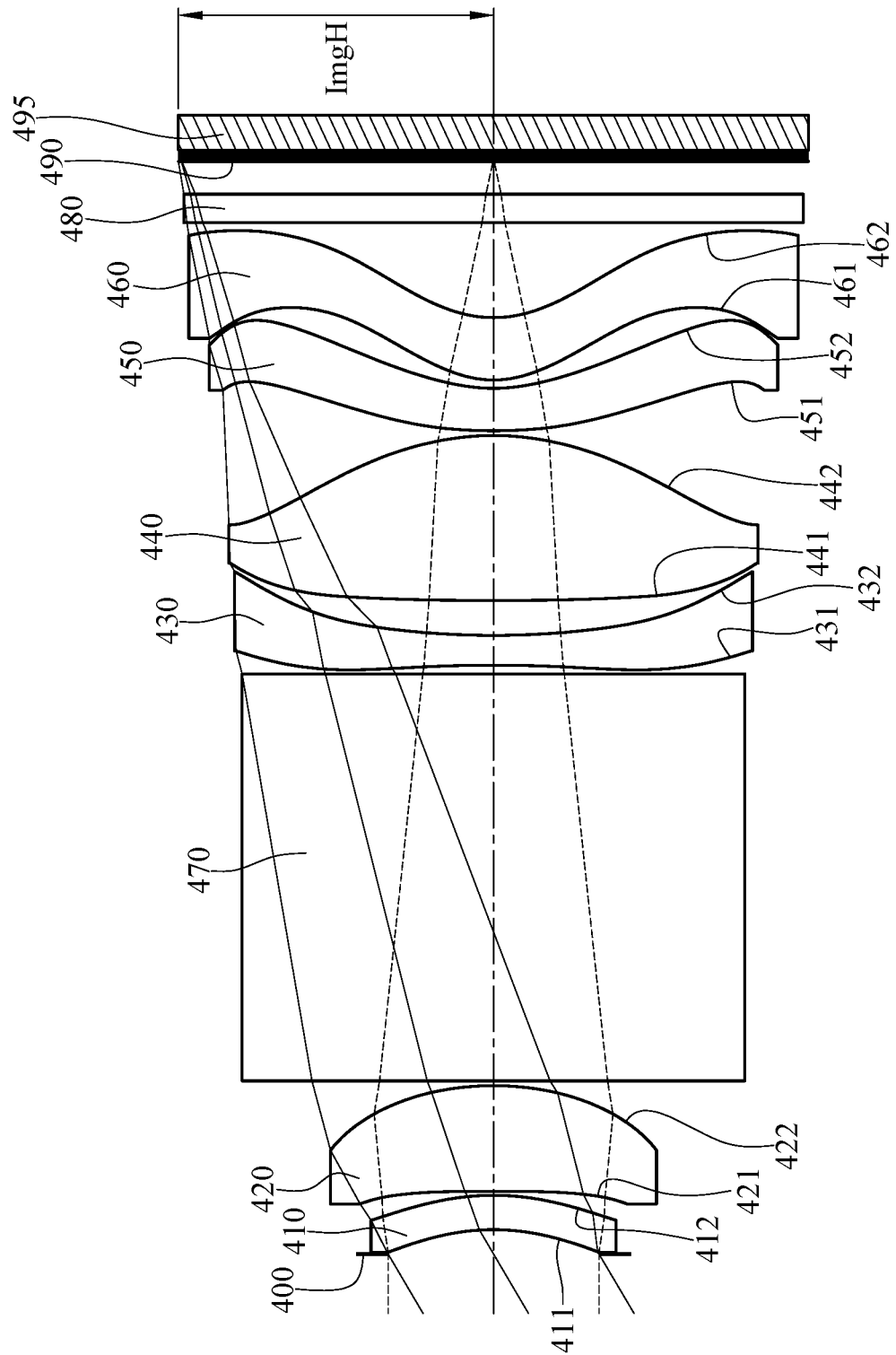
FIG. 10 is a cross-sectional view of an image capturing unit corresponding to a diagonal direction of a photosensitive area of an image sensor according to the 4th embodiment of the present disclosure.
Figure 11:
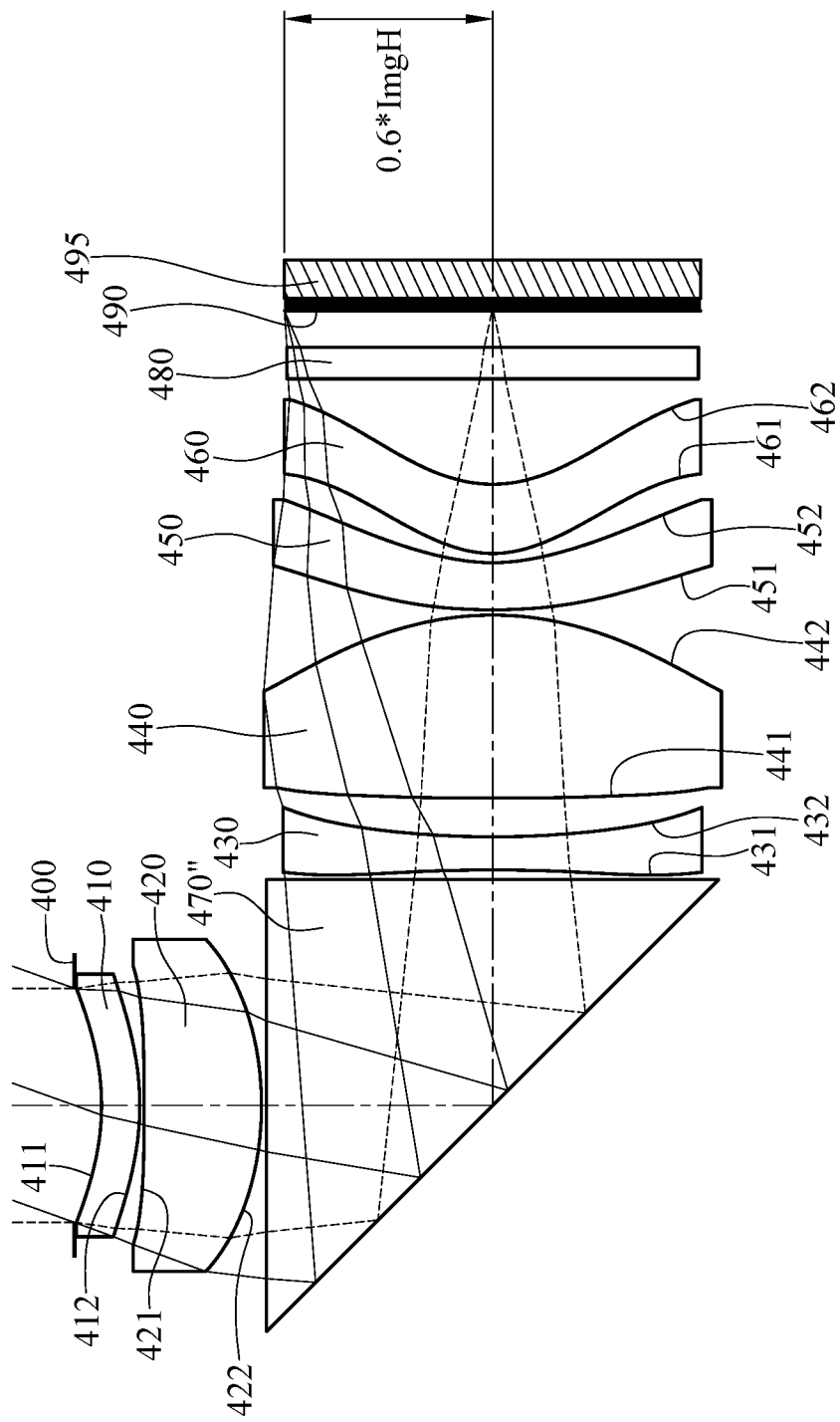
FIG. 11 is a cross-sectional view of the image capturing unit corresponding to a width direction of the photosensitive area of the image sensor with optical path being refracted by a prism according to the 4th embodiment of the present disclosure.
Figure 12:
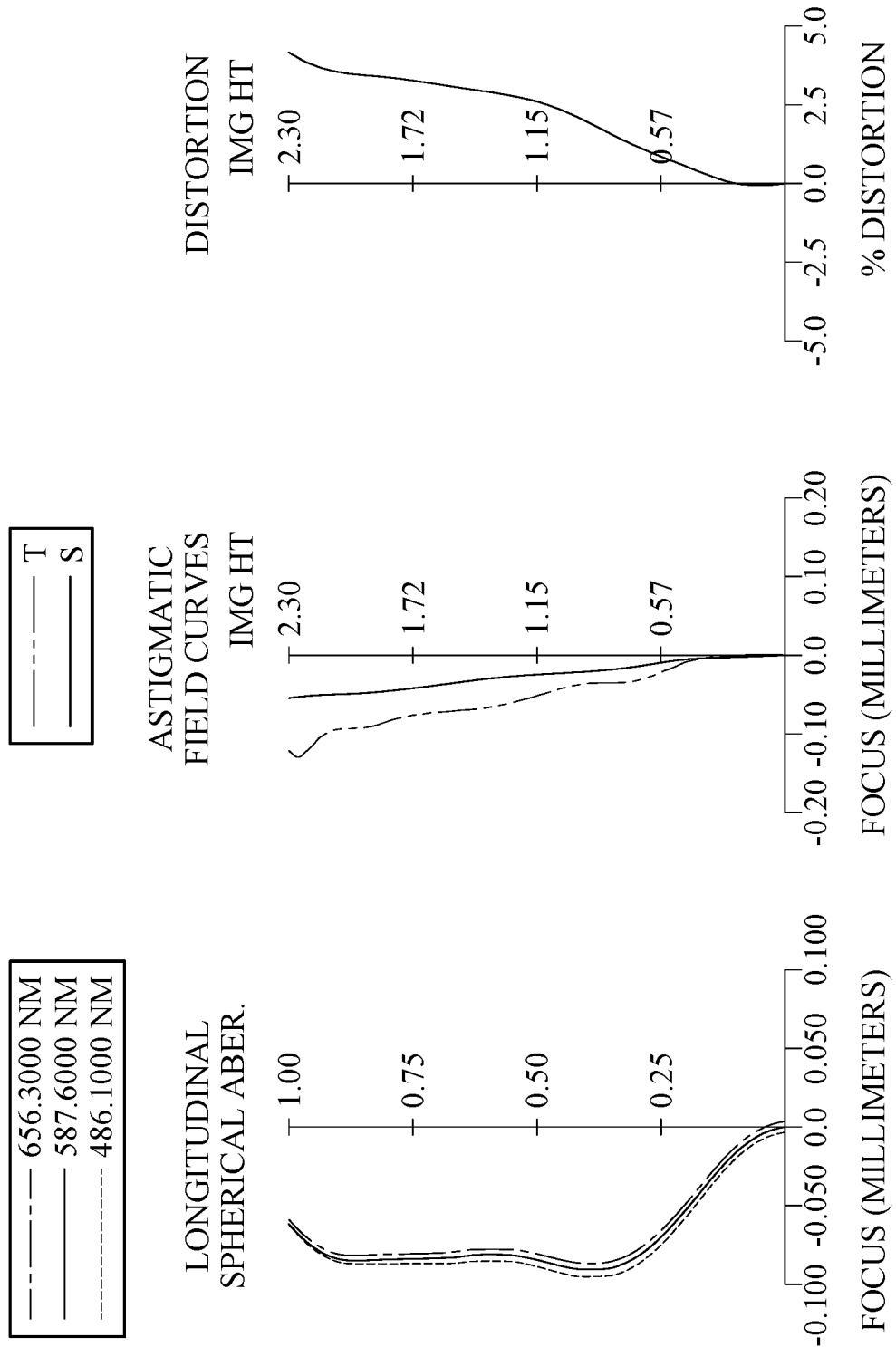
FIG. 12 shows spherical aberration curves, astigmatic field curves and a distortion curve of the image capturing unit according to the 4th embodiment.

FIG. 10 is a cross-sectional view of an image capturing unit corresponding to a diagonal direction of a photosensitive area of an image sensor according to the 4th embodiment of the present disclosure. FIG. 11 is a cross-sectional view of the image capturing unit corresponding to a width direction of the photosensitive area of the image sensor with optical path being refracted by a prism according to the 4th embodiment of the present disclosure. FIG. 12 shows, in order from left to right, spherical aberration curves, astigmatic field curves and a distortion curve of the image capturing unit according to the 4th embodiment. In FIG. 10, the image capturing unit includes the imaging optical lens assembly (its reference numeral is omitted) of the present disclosure and an image sensor 495. The imaging optical lens assembly includes, in order from an object side to an image side along an optical path, an aperture stop 400, a first lens element 410, a second lens element 420, a prism 470, a third lens element 430, a fourth lens element 440, a fifth lens element 450, a sixth lens element 460, a filter 480 and an image surface 490. The imaging optical lens assembly includes six single and non-cemented lens elements (410, 420, 430, 440, 450 and 460) with no additional lens element disposed between each of the adjacent six lens elements, wherein there is an air gap between each of all adjacent lens elements. In FIG. 10, the optical path is not folded. In a different configuration having an optical path of the same length, as shown in FIG. 11, the imaging optical lens assembly is provided with a reflective prism 470" for reflecting incident light, such that the optical path is folded at the reflective prism 470".

The first lens element 410 with negative refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has at least one inflection point.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with positive refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has at least one inflection point. The image-side surface 462 of the sixth lens element 460 has at least one inflection point.

The prism 470 (the reflective prism 470") is made of glass material and located between the second lens element 420 and the third lens element 430, and will not affect the focal length of the imaging optical lens assembly. The filter 480 is made of glass material and located between the sixth lens element 460 and the image surface 490, and will not affect the focal length of the imaging optical lens assembly. The image sensor 495 is disposed on or near the image surface 490 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the third lens element 430, the fourth lens element 440, the fifth lens element 450 and the sixth lens element 460 are non-circular lens elements.

The detailed optical data of the 4th embodiment are shown in Table 7 and the aspheric surface data are shown in Table 8 below.

TABLE 7

4th Embodiment
f = 3.79 mm, Fno = 2.44, HFOV = 30.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.180 | | | | |
| 2 | Lens 1 | −1.584 | (ASP) | 0.253 | Plastic | 1.669 | 19.5 | −26.93 |
| 3 | | −1.847 | (ASP) | 0.030 | | | | |
| 4 | Lens 2 | −22.127 | (ASP) | 0.778 | Plastic | 1.544 | 56.0 | 4.35 |
| 5 | | −2.163 | (ASP) | 0.035 | | | | |
| 6 | Prism | Plano | | 3.000 | Glass | 1.517 | 64.2 | — |
| 7 | | Plano | | 0.064 | | | | |
| 8 | Lens 3 | −10.892 | (ASP) | 0.220 | Plastic | 1.679 | 18.4 | −5.79 |
| 9 | | 6.199 | (ASP) | 0.258 | | | | |
| 10 | Lens 4 | 74.913 | (ASP) | 1.215 | Plastic | 1.544 | 56.0 | 3.64 |
| 11 | | −2.023 | (ASP) | 0.035 | | | | |
| 12 | Lens 5 | 3.973 | (ASP) | 0.313 | Plastic | 1.529 | 45.4 | −3.67 |
| 13 | | 1.270 | (ASP) | 0.061 | | | | |
| 14 | Lens 6 | 0.736 | (ASP) | 0.460 | Plastic | 1.534 | 55.9 | 3.94 |
| 15 | | 0.885 | (ASP) | 0.700 | | | | |
| 16 | Filter | Plano | | 0.210 | Glass | 1.517 | 64.2 | — |
| 17 | | Plano | | 0.242 | | | | |
| 18 | Image | Plano | | — | | | | |

Note:
Reference wavelength is 587.6 nm (d-line).

TABLE 8

Aspheric Coefficients

| Surface # | 2 | 3 | 4 | 5 | 8 | 9 |
|---|---|---|---|---|---|---|
| k = | −2.9519E+00 | −3.0012E+00 | −1.5219E+01 | 1.6045E+00 | −4.8609E+01 | 2.8452E+00 |
| A4 = | 5.1286E−02 | 1.3745E−03 | −6.3653E−02 | −2.4797E−02 | −1.4153E−02 | −3.2152E−03 |
| A6 = | −3.1593E−01 | 1.5514E−01 | 2.6133E−02 | 6.6045E−02 | 3.1479E−02 | −7.7501E−03 |
| A8 = | 1.2101E+00 | −7.3936E−01 | −2.3064E−01 | −1.3514E−01 | −9.9201E−03 | 2.0343E−02 |
| A10 = | −2.5598E+00 | 1.6908E+00 | 5.9390E−01 | 1.5752E−01 | 6.5648E−04 | −1.0615E−02 |

TABLE 8-continued

| Aspheric Coefficients | | | | | | |
|---|---|---|---|---|---|---|
| A12 = | 2.8468E+00 | −1.7894E+00 | −6.5805E−01 | −9.2039E−02 | 2.2144E−04 | 2.3251E−03 |
| A14 = | −1.2798E+00 | 7.2171E−01 | 2.5450E−01 | 2.0768E−02 | −3.3685E−05 | −1.9337E−04 |

| Surface # | 10 | 11 | 12 | 13 | 14 | 15 |
|---|---|---|---|---|---|---|
| k = | −1.0000E+00 | −1.1613E+00 | −7.7949E+00 | −8.8069E+00 | −2.7710E+00 | −1.9901E+00 |
| A4 = | 4.9945E−02 | 2.3338E−02 | 1.1192E−01 | 7.1281E−02 | 4.1160E−02 | 5.0659E−02 |
| A6 = | −7.0754E−02 | −2.8593E−02 | −1.2254E−01 | −4.7560E−02 | −8.9831E−02 | −1.5660E−01 |
| A8 = | 5.0332E−02 | 1.7636E−02 | 6.9018E−02 | 1.0366E−02 | 1.4061E−02 | 9.4882E−02 |
| A10 = | −1.7245E−02 | −4.5296E−03 | −2.2146E−02 | 9.2117E−04 | 1.3561E−02 | −2.9465E−02 |
| A12 = | 2.9729E−03 | 5.2989E−03 | 3.7546E−03 | −8.2449E−04 | −6.6767E−03 | 5.1171E−03 |
| A14 = | −2.0683E−04 | −1.7893E−05 | −2.6874E−04 | 9.2741E−05 | 1.1388E−03 | −4.6861E−04 |
| A16 = | — | — | — | — | −6.8335E−05 | 1.7470E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.79 | T34/(T45 + T56) | 2.69 |
| Fno | 2.44 | |R4/R3| | 0.10 |
| HFOV [deg.] | 30.5 | (R7 + R8)/(R7 − R8) | 0.95 |
| Nr | 1.517 | (R8 + R9)/(R8 − R9) | −0.33 |
| Nmax | 1.679 | f/f1 | −0.14 |
| Vdmin | 18.4 | f/f4 | 1.04 |
| V1 | 19.45 | Y11/R1 | −0.49 |
| CT1/CT2 | 0.33 | Y11/ImgH | 0.34 |
| CT1/CT4 | 0.21 | ImgH/f | 0.61 |
| Dr4r5/T34 | 12.01 | SL/TL | 1.02 |
| T34/T45 | 7.37 | TL/f | 2.08 |
| Dr4r5/ΣCT | 0.96 | — | — |

5th Embodiment

Figure 13:
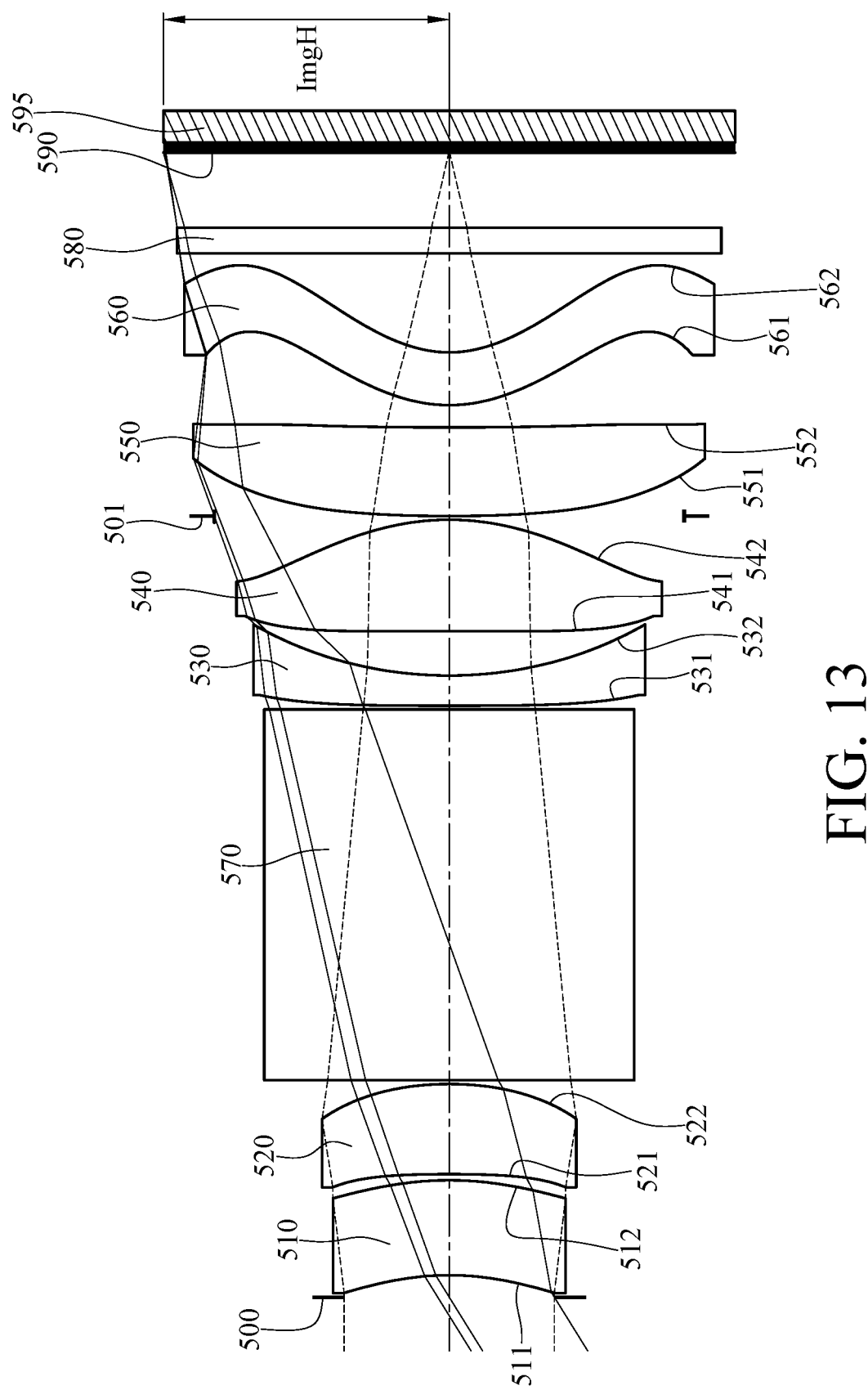
FIG. 13 is a cross-sectional view of an image capturing unit corresponding to a diagonal direction of a photosensitive area of an image sensor according to the 5th embodiment of the present disclosure.
Figure 14:
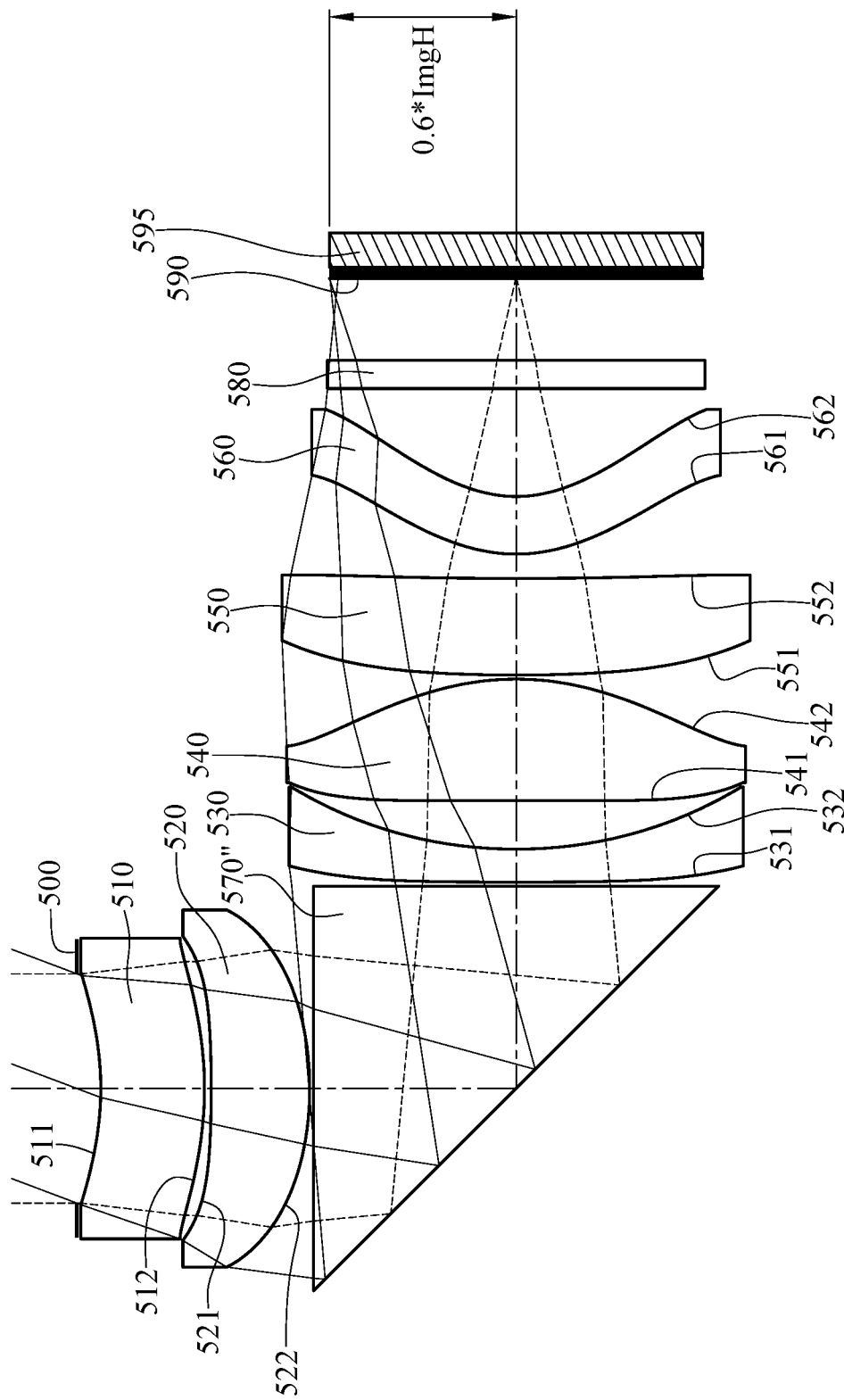
FIG. 14 is a cross-sectional view of the image capturing unit corresponding to a width direction of the photosensitive area of the image sensor with optical path being refracted by a prism according to the 5th embodiment of the present disclosure.
Figure 15:
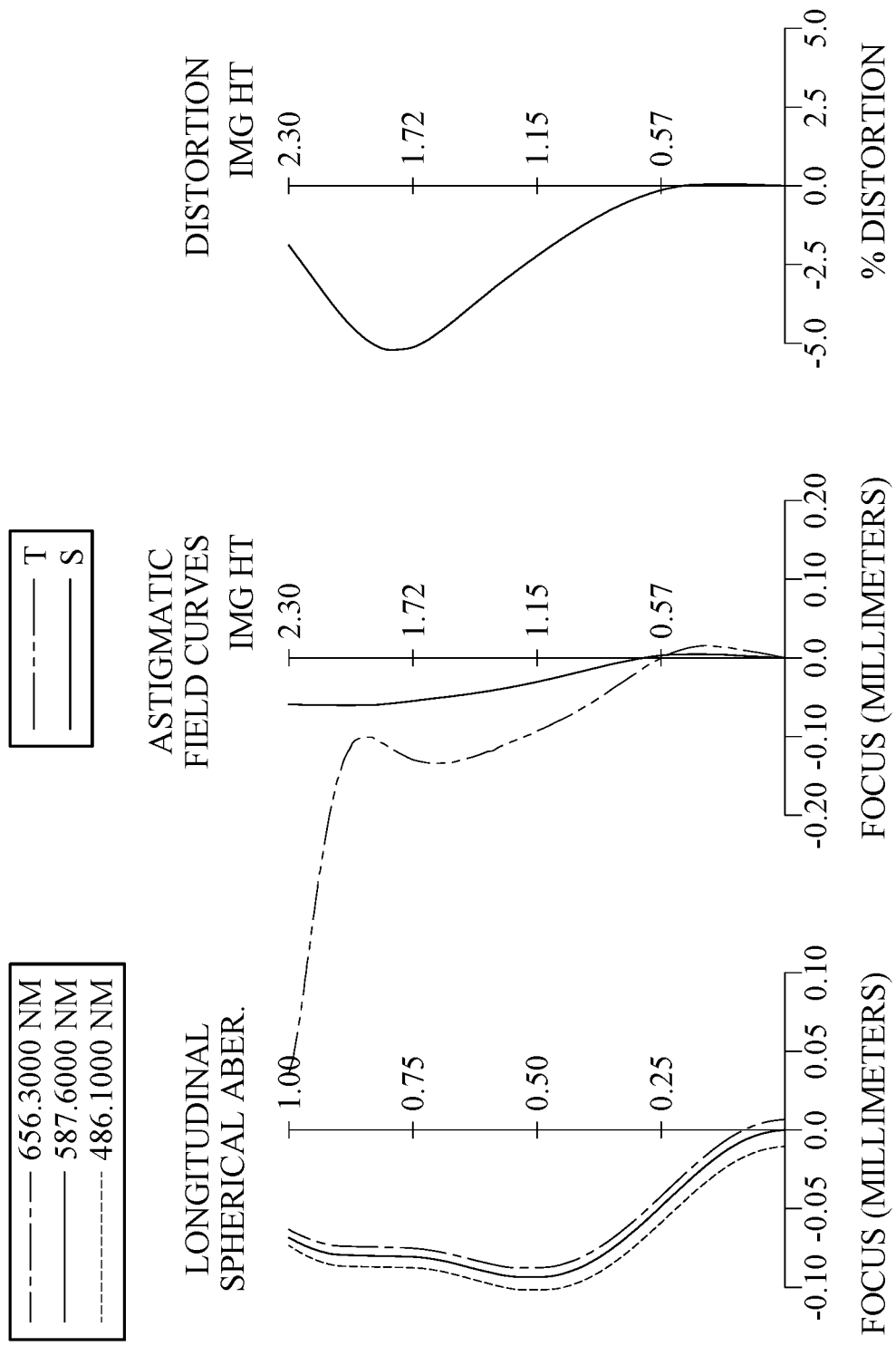
FIG. 15 shows spherical aberration curves, astigmatic field curves and a distortion curve of the image capturing unit according to the 5th embodiment.

FIG. 13 is a cross-sectional view of an image capturing unit corresponding to a diagonal direction of a photosensitive area of an image sensor according to the 5th embodiment of the present disclosure. FIG. 14 is a cross-sectional view of the image capturing unit corresponding to a width direction of the photosensitive area of the image sensor with optical path being refracted by a prism according to the 5th embodiment of the present disclosure. FIG. 15 shows, in order from left to right, spherical aberration curves, astigmatic field curves and a distortion curve of the image capturing unit according to the 5th embodiment. In FIG. 13, the image capturing unit includes the imaging optical lens assembly (its reference numeral is omitted) of the present disclosure and an image sensor 595. The imaging optical lens assembly includes, in order from an object side to an image side along an optical path, an aperture stop 500, a first lens element 510, a second lens element 520, a prism 570, a third lens element 530, a fourth lens element 540, a stop 501, a fifth lens element 550, a sixth lens element 560, a filter 580 and an image surface 590. The imaging optical lens assembly includes six single and non-cemented lens elements (510, 520, 530, 540, 550 and 560) with no additional lens element disposed between each of the adjacent six lens elements, wherein there is an air gap between each of all adjacent lens elements. In FIG. 13, the optical path is not folded. In a different configuration having an optical path of the same length, as shown in FIG. 14, the imaging optical lens assembly is provided with a reflective prism 570" for reflecting incident light, such that the optical path is folded at the reflective prism 570".

The first lens element 510 with negative refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of fourth lens element 540 has at least one inflection point.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has at least one inflection point. The image-side surface 562 of the sixth lens element 560 has at least one inflection point.

The prism 570 (the reflective prism 570″) is made of glass material and located between the second lens element 520 and the third lens element 530, and will not affect the focal length of the imaging optical lens assembly. The filter 580 is made of glass material and located between the sixth lens element 560 and the image surface 590, and will not affect the focal length of the imaging optical lens assembly. The image sensor 595 is disposed on or near the image surface 590 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the fourth lens element 540, the fifth lens element 550 and the sixth lens element 560 are non-circular lens elements.

The detailed optical data of the 5th embodiment are shown in Table 9 and the aspheric surface data are shown in Table 10 below.

TABLE 9

5th Embodiment
f = 3.81 mm, Fno = 2.24, HFOV = 31.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.178 | | | | |
| 2 | Lens 1 | −2.195 | (ASP) | 0.768 | Plastic | 1.669 | 19.5 | −61.16 |
| 3 | | −2.645 | (ASP) | 0.050 | | | | |
| 4 | Lens 2 | −9.976 | (ASP) | 0.729 | Plastic | 1.544 | 56.0 | 5.68 |
| 5 | | −2.419 | (ASP) | 0.030 | | | | |
| 6 | Prism | Plano | | 3.000 | Glass | 1.517 | 64.2 | — |
| 7 | | Plano | | 0.030 | | | | |
| 8 | Lens 3 | 67.012 | (ASP) | 0.244 | Plastic | 1.669 | 19.5 | −5.19 |
| 9 | | 3.295 | (ASP) | 0.361 | | | | |
| 10 | Lens 4 | −57.603 | (ASP) | 0.900 | Plastic | 1.544 | 56.0 | 3.91 |
| 11 | | −2.063 | (ASP) | 0.030 | | | | |
| 12 | Stop | Plano | | 0.000 | | | | |
| 13 | Lens 5 | 12.608 | (ASP) | 0.717 | Plastic | 1.544 | 56.0 | 31.09 |
| 14 | | 48.536 | (ASP) | 0.180 | | | | |
| 15 | Lens 6 | 1.210 | (ASP) | 0.427 | Plastic | 1.544 | 56.0 | −21.12 |
| 16 | | 0.959 | (ASP) | 0.800 | | | | |
| 17 | Filter | Plano | | 0.210 | Glass | 1.517 | 64.2 | — |
| 18 | | Plano | | 0.606 | | | | |
| 19 | Image | Plano | | — | | | | |

Note:
Reference wavelength is 587.6 nm (d-line).
An effective radius of the stop 501 (Surface 12) is 1.900 mm.

TABLE 10

Aspheric Coefficients

| Surface # | 2 | 3 | 4 | 5 | 8 | 9 |
|---|---|---|---|---|---|---|
| k = | −3.8417E+00 | −2.9940E+00 | −1.0000E+00 | 2.0894E+00 | −1.0000E+00 | −1.5607E−01 |
| A4 = | 2.3046E−02 | 1.5168E−02 | −4.8609E−02 | −2.3181E−02 | 8.0466E−03 | 4.0356E−04 |
| A6 = | −3.8123E−02 | 9.9309E−03 | −4.0187E−02 | 6.8862E−03 | 2.6999E−03 | 8.1277E−04 |
| A8 = | 4.1033E−02 | −2.9451E−02 | 1.0468E−02 | −2.9763E−03 | −3.1899E−05 | 5.9546E−05 |
| A10 = | −6.9358E−03 | 1.5441E−02 | −1.7198E−03 | 9.1458E−04 | −1.3774E−04 | −2.8591E−05 |
| A12 = | −1.6581E−02 | 3.6290E−03 | −8.9735E−03 | −6.6795E−04 | −2.2578E−05 | −1.0128E−05 |
| A14 = | 1.0551E−02 | 7.9155E−04 | 5.8027E−03 | 4.2800E−04 | 8.0769E−06 | −7.2104E−07 |

| Surface # | 10 | 11 | 13 | 14 | 15 | 16 |
|---|---|---|---|---|---|---|
| k = | −1.0000E+02 | −1.3803E+00 | 1.8824E+01 | −6.2491E+02 | −2.5749E+00 | −2.3811E+00 |
| A4 = | 1.1626E−02 | 6.3216E−03 | 1.2396E−02 | 5.8973E−03 | 2.9643E−02 | 4.6320E−02 |
| A6 = | 1.1193E−03 | 2.3899E−03 | 9.4988E−04 | −2.5667E−03 | −1.9516E−02 | −4.0861E−02 |
| A8 = | 3.9365E−04 | 2.9378E−04 | −1.0408E−04 | 6.9079E−05 | −6.1789E−04 | 6.4201E−03 |
| A10 = | 1.1491E−04 | 1.0774E−04 | −3.8528E−05 | 1.6383E−05 | 2.8858E−04 | −2.5700E−04 |
| A12 = | 7.6877E−06 | 1.8067E−05 | −1.5371E−06 | 1.9176E−06 | 2.1098E−05 | −8.1077E−07 |
| A14 = | −7.0171E−06 | −5.6090E−07 | 2.3858E−06 | 1.1626E−06 | −5.1303E−06 | −1.1274E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.81 | T34/(T45 + T56) | 1.72 |
| Fno | 2.24 | |R4/R3| | 0.24 |
| HFOV [deg.] | 31.8 | (R7 + R8)/(R7 − R8) | 1.07 |
| Nr | 1.517 | (R8 + R9)/(R8 − R9) | −0.72 |
| Nmax | 1.669 | f/f1 | −0.06 |
| Vdmin | 19.5 | f/f4 | 0.97 |
| V1 | 19.45 | Y11/R1 | −0.39 |
| CT1/CT2 | 1.05 | Y11/ImgH | 0.37 |
| CT1/CT4 | 0.85 | ImgH/f | 0.60 |
| Dr4r5/T34 | 8.48 | SL/TL | 1.02 |
| T34/T45 | 12.02 | TL/f | 2.39 |
| Dr4r5/ΣCT | 0.81 | — | — |

6th Embodiment

Figure 16:
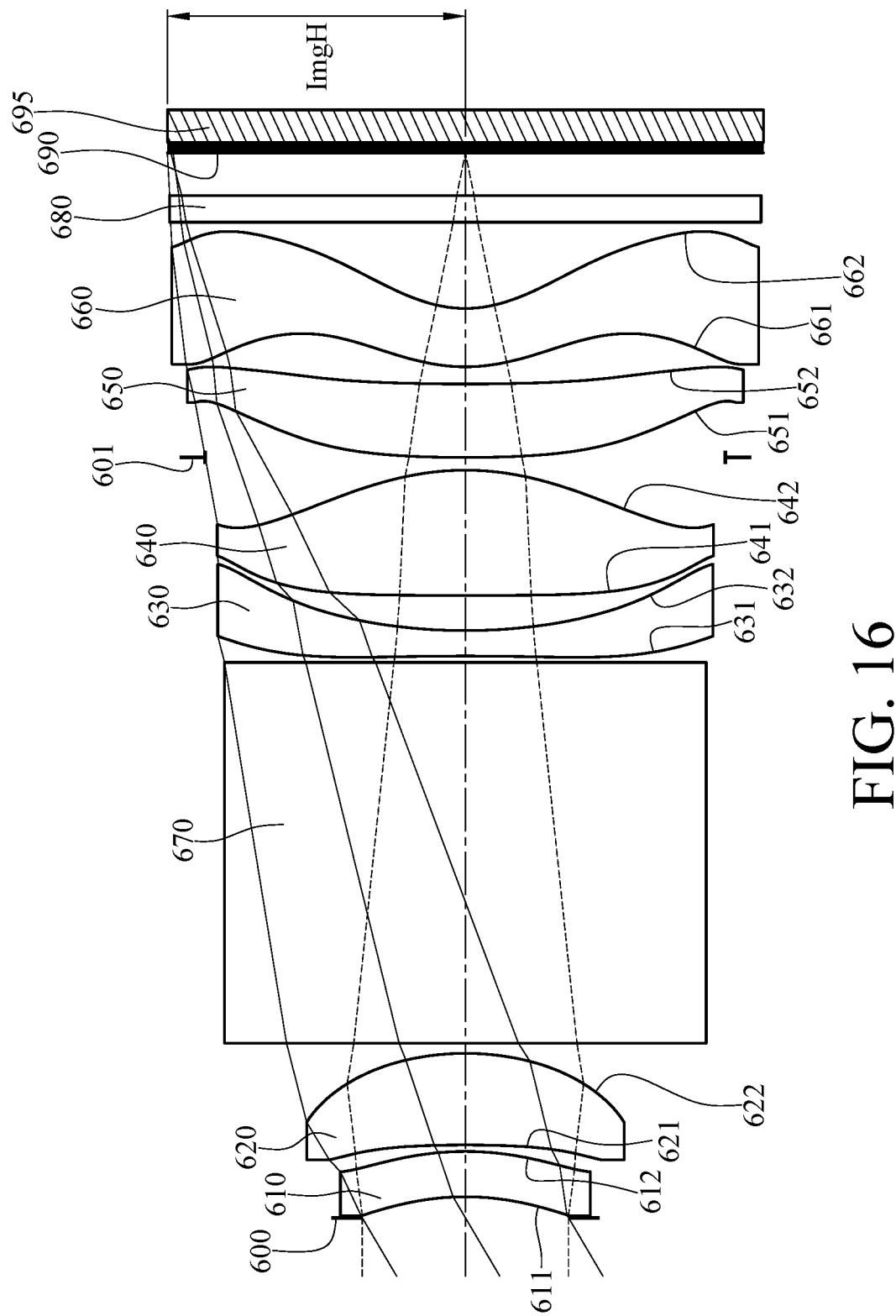
FIG. 16 is a cross-sectional view of an image capturing unit corresponding to a diagonal direction of a photosensitive area of an image sensor according to the 6th embodiment of the present disclosure.
Figure 17:
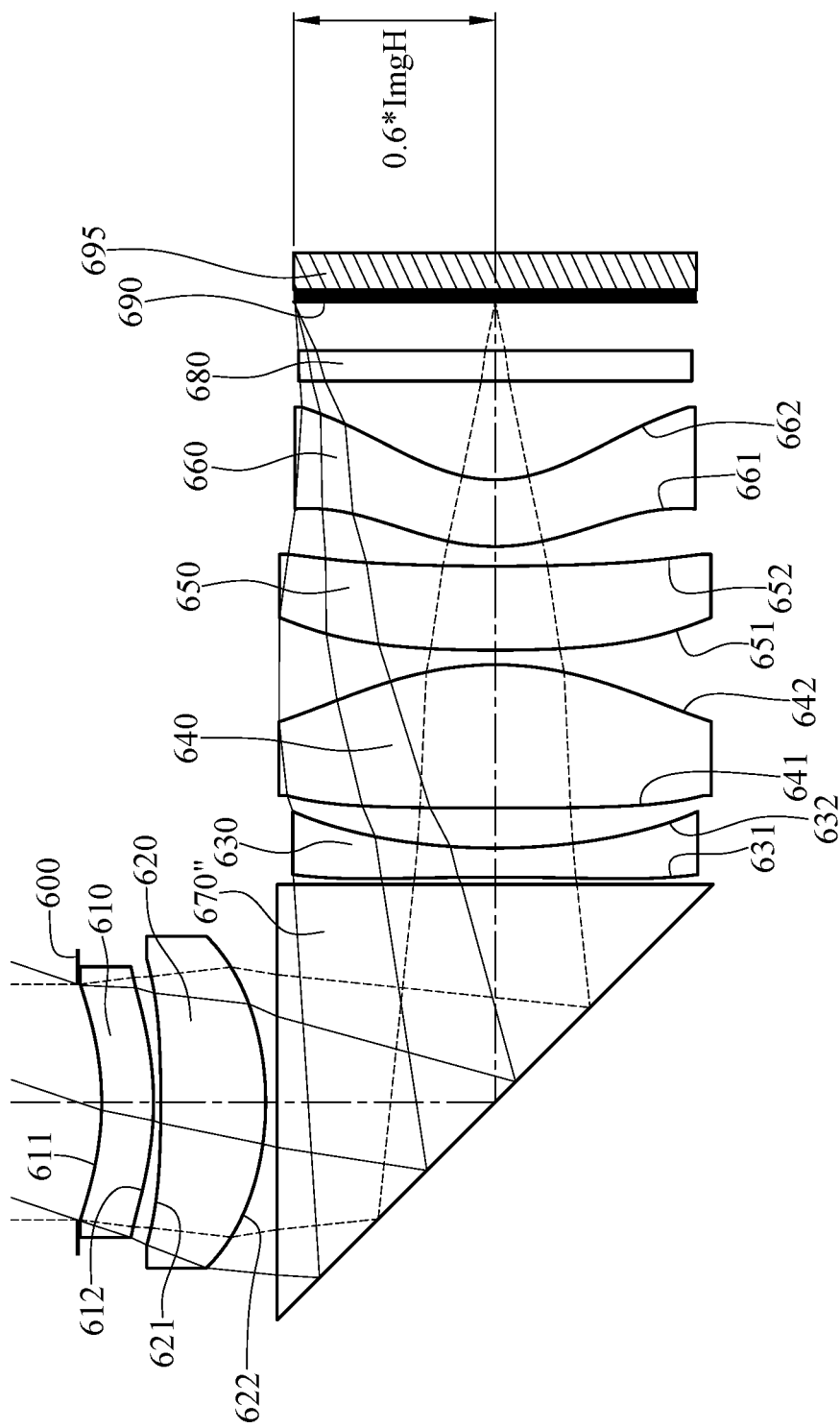
FIG. 17 is a cross-sectional view of the image capturing unit corresponding to a width direction of the photosensitive area of the image sensor with optical path being refracted by a prism according to the 6th embodiment of the present disclosure.
Figure 18:
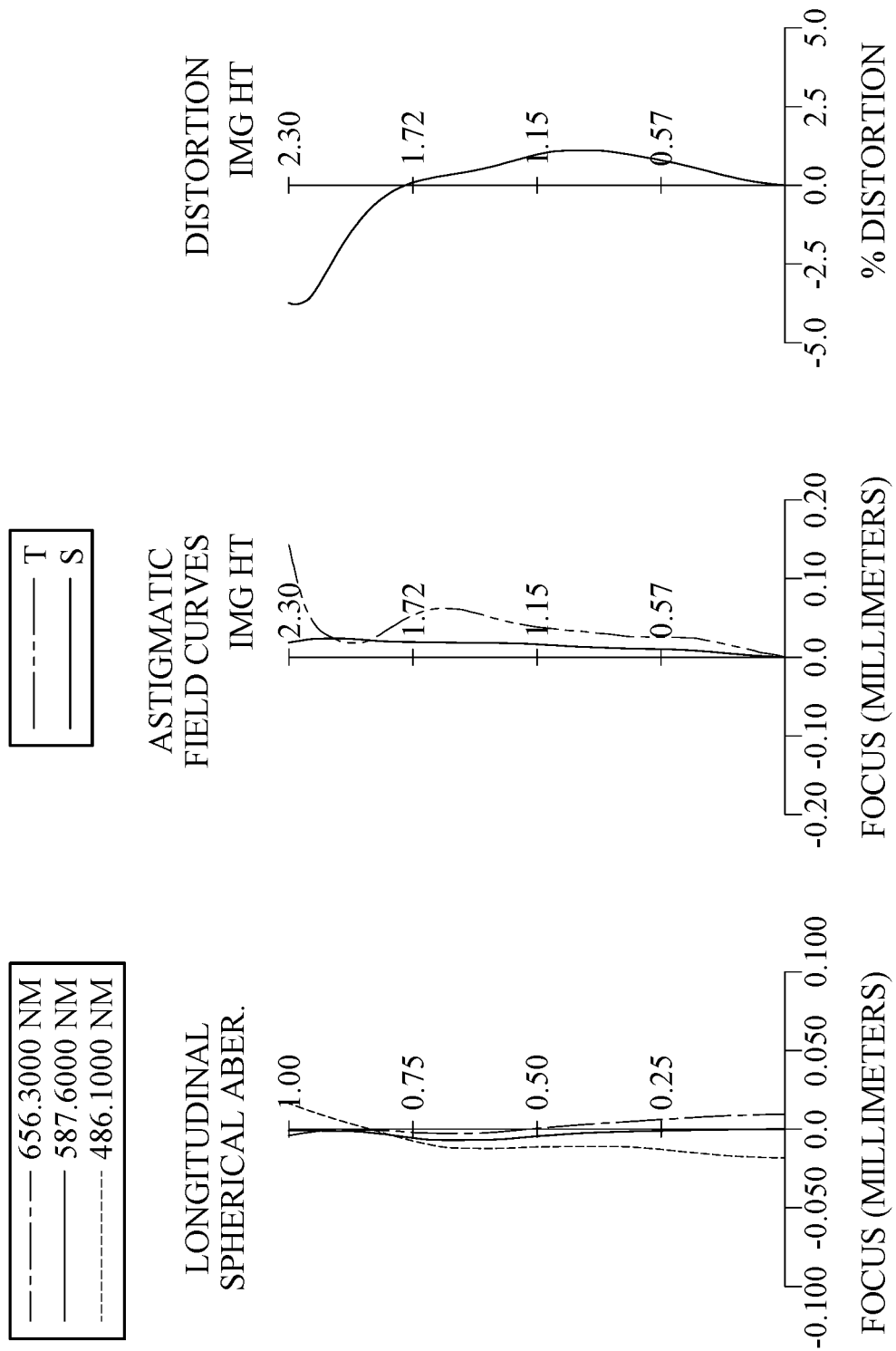
FIG. 18 shows spherical aberration curves, astigmatic field curves and a distortion curve of the image capturing unit according to the 6th embodiment.

FIG. 16 is a cross-sectional view of an image capturing unit corresponding to a diagonal direction of a photosensitive area of an image sensor according to the 6th embodiment of the present disclosure. FIG. 17 is a cross-sectional view of the image capturing unit corresponding to a width direction of the photosensitive area of the image sensor with optical path being refracted by a prism according to the 6th embodiment of the present disclosure. FIG. 18 shows, in order from left to right, spherical aberration curves, astigmatic field curves and a distortion curve of the image capturing unit according to the 6th embodiment. In FIG. 16, the image capturing unit includes the imaging optical lens assembly (its reference numeral is omitted) of the present disclosure and an image sensor 695. The imaging optical lens assembly includes, in order from an object side to an image side along an optical path, an aperture stop 600, a first lens element 610, a second lens element 620, a prism 670, a third lens element 630, a fourth lens element 640, a stop 601, a fifth lens element 650, a sixth lens element 660, a filter 680 and an image surface 690. The imaging optical lens assembly includes six single and non-cemented lens elements (610, 620, 630, 640, 650 and 660) with no additional lens element disposed between each of the adjacent six lens elements, wherein there is an air gap between each of all adjacent lens elements. In FIG. 16, the optical path is not folded. In a different configuration having an optical path of the same length, as shown in FIG. 17, the imaging optical lens assembly is provided with a reflective prism 670" for reflecting incident light, such that the optical path is folded at the reflective prism 670".

The first lens element 610 with positive refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has at least one inflection point.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has at least one inflection point. The image-side surface 662 of the sixth lens element 660 has at least one inflection point.

The prism 670 (the reflective prism 670") is made of glass material and located between the second lens element 620 and the third lens element 630, and will not affect the focal length of the imaging optical lens assembly. The filter 680 is made of glass material and located between the sixth lens element 660 and the image surface 690, and will not affect the focal length of the imaging optical lens assembly. The image sensor 695 is disposed on or near the image surface 690 of the imaging optical lens assembly.

In this embodiment, a maximum distance between the optical axis and the imaging position corresponding to the width direction of the effective photosensitive area of the image sensor is 0.6 times of a maximum image height of the imaging optical lens assembly.

In this embodiment, the third lens element 630, the fourth lens element 640, the fifth lens element 650 and the sixth lens element 660 are non-circular lens elements.

The detailed optical data of the 6th embodiment are shown in Table 11 and the aspheric surface data are shown in Table 12 below.

TABLE 11

6th Embodiment
f = 4.06 mm, Fno = 2.50, HFOV = 30.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.165 | | | | |
| 2 | Lens 1 | −2.024 | (ASP) | 0.357 | Plastic | 1.700 | 17.5 | 329.22 |
| 3 | | −2.152 | (ASP) | 0.051 | | | | |
| 4 | Lens 2 | −7.852 | (ASP) | 0.721 | Plastic | 1.544 | 56.0 | 5.18 |
| 5 | | −2.142 | (ASP) | 0.080 | | | | |
| 6 | Prism | Plano | | 3.000 | Plastic | 1.534 | 55.9 | — |
| 7 | | Plano | | 0.050 | | | | |
| 8 | Lens 3 | −19.859 | (ASP) | 0.200 | Plastic | 1.679 | 18.4 | −5.38 |
| 9 | | 4.500 | (ASP) | 0.277 | | | | |
| 10 | Lens 4 | 104.209 | (ASP) | 0.986 | Plastic | 1.544 | 56.0 | 3.87 |
| 11 | | −2.140 | (ASP) | 0.100 | | | | |
| 12 | Stop | Plano | | 0.000 | | | | |
| 13 | Lens 5 | 10.718 | (ASP) | 0.579 | Plastic | 1.529 | 45.4 | 53.19 |
| 14 | | 16.986 | (ASP) | 0.135 | | | | |
| 15 | Lens 6 | 1.371 | (ASP) | 0.460 | Plastic | 1.544 | 56.0 | −9.15 |
| 16 | | 0.948 | (ASP) | 0.680 | | | | |
| 17 | Filter | Plano | | 0.210 | Glass | 1.517 | 64.2 | — |
| 18 | | Plano | | 0.335 | | | | |
| 19 | Image | Plano | | — | | | | |

Note:
Reference wavelength is 587.6 nm (d-line).
An effective radius of the stop 601 (Surface 12) is 2.047 mm.

TABLE 12

Aspheric Coefficients

| Surface # | 2 | 3 | 4 | 5 | 8 | 9 |
|---|---|---|---|---|---|---|
| k = | −2.8307E+00 | −3.3359E+00 | −1.5226E+01 | 1.4760E+00 | −1.5471E+01 | 4.3683E−01 |
| A4 = | 4.4755E−02 | 1.3360E−01 | 8.4074E−02 | −3.4266E−03 | 1.2952E−02 | 3.1549E−03 |
| A6 = | −2.4693E−01 | −5.7725E−01 | −5.9118E−02 | −1.8199E−02 | 2.9056E−03 | 1.8713E−03 |
| A8 = | 7.3128E−01 | 1.3293E+00 | 1.3047E+00 | 3.6072E−02 | −5.4367E−05 | 3.0800E−04 |
| A10 = | −1.1551E+00 | −1.5896E+00 | −1.6177E+00 | −3.9157E−02 | −1.2580E−04 | −6.5478E−06 |
| A12 = | 9.6924E−01 | 9.7947E−01 | 1.0871E+00 | 2.1783E−02 | −1.5262E−05 | −2.2422E−05 |
| A14 = | −3.2587E−01 | −2.2762E−01 | −3.4544E−01 | −4.8280E−03 | 5.2688E−06 | −6.2325E−06 |
| A16 = | — | — | 3.7669E−02 | — | — | — |

| Surface # | 10 | 11 | 13 | 14 | 15 | 16 |
|---|---|---|---|---|---|---|
| k = | −1.0000E+00 | −2.2739E+00 | 5.6664E+00 | 3.4943E+01 | −4.4462E+00 | −2.7333E+00 |
| A4 = | 1.4065E−02 | 1.3511E−02 | 3.4747E−02 | −8.6796E−03 | 5.5060E−03 | 5.4802E−02 |
| A6 = | −8.6089E−03 | −2.6163E−02 | −2.5041E−02 | 1.5329E−02 | −7.9252E−02 | −1.4182E−01 |
| A8 = | 1.3304E−02 | 3.4392E−02 | 3.2311E−02 | 9.3891E−04 | 3.8754E−02 | 9.0088E−02 |
| A10 = | −6.6997E−03 | −1.8534E−02 | −2.0026E−02 | −7.0454E−03 | −7.4597E−03 | −2.9456E−02 |
| A12 = | 1.6359E−03 | 4.9971E−03 | 6.0394E−03 | 3.1692E−03 | 1.8086E−04 | 5.4225E−03 |
| A14 = | −1.5989E−04 | −6.3376E−04 | −8.8281E−04 | −5.6188E−04 | 1.2307E−04 | −5.4560E−04 |
| A16 = | — | 2.9025E−05 | 4.9545E−05 | 3.5917E−05 | −1.1325E−05 | 2.3736E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 4.06 | T34/(T45 + T56) | 1.18 |
| Fno | 2.50 | |R4/R3| | 0.27 |

-continued

| 6th Embodiment | | | |
|---|---|---|---|
| HFOV [deg.] | 30.5 | (R7 + R8)/(R7 − R8) | 0.96 |
| Nr | 1.534 | (R8 + R9)/(R8 − R9) | −0.67 |
| Nmax | 1.700 | f/f1 | 0.01 |
| Vdmin | 17.5 | f/f4 | 1.05 |
| V1 | 17.50 | Y11/R1 | −0.41 |
| CT1/CT2 | 0.50 | Y11/ImgH | 0.36 |
| CT1/CT4 | 0.36 | ImgH/f | 0.57 |
| Dr4r5/T34 | 11.30 | SL/TL | 1.02 |
| T34/T45 | 2.77 | TL/f | 2.03 |
| Dr4r5/ΣCT | 0.95 | — | — |

7th Embodiment

Figure 19:
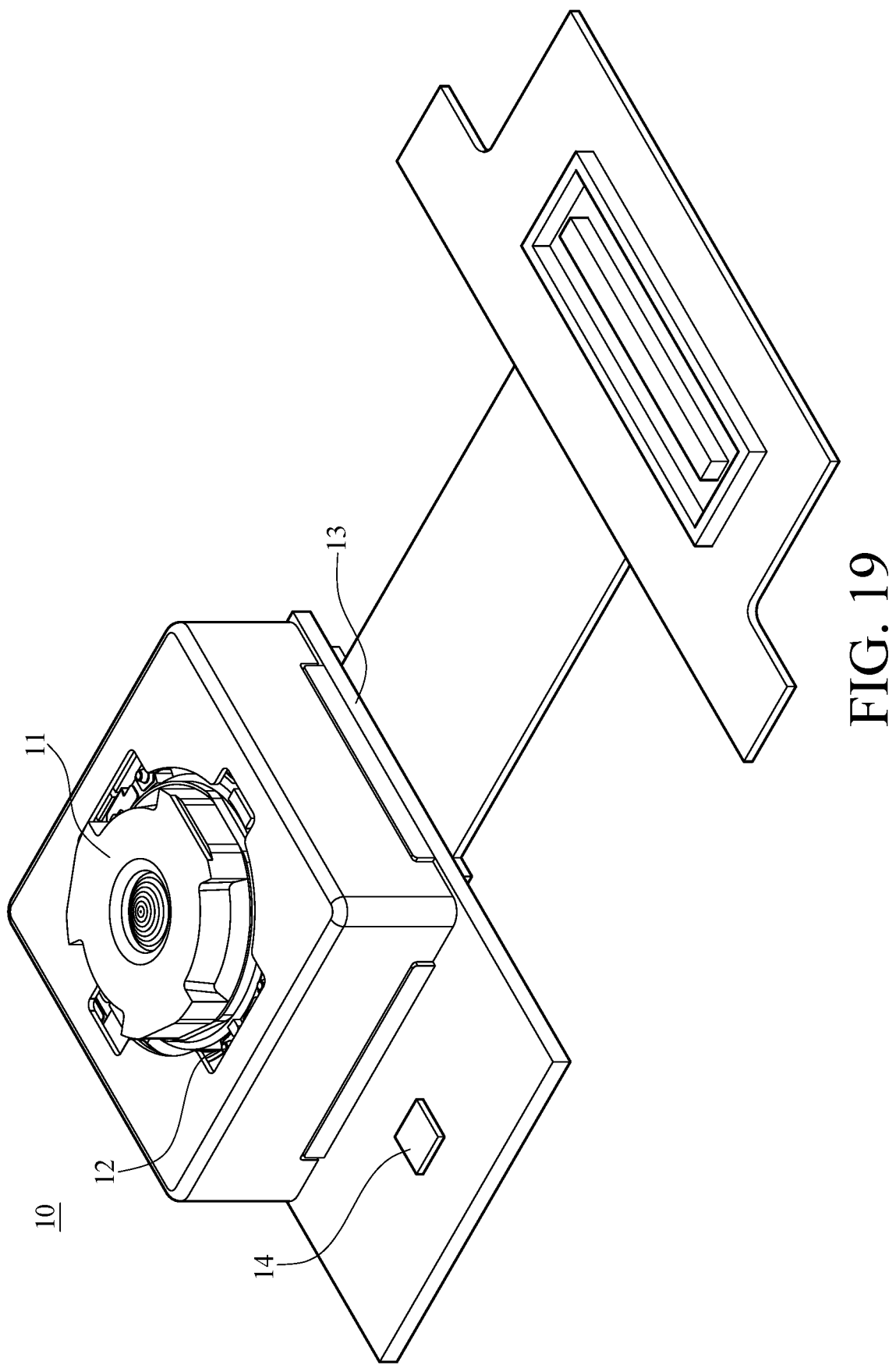
FIG. 19 is a perspective view of an image capturing unit according to the 7th embodiment of the present disclosure.

FIG. 19 is a perspective view of an image capturing unit according to the 7th embodiment of the present disclosure. In this embodiment, an image capturing unit 10 is a camera module including a lens unit 11, a driving device 12, an image sensor 13 and an image stabilizer 14. The lens unit 11 includes the imaging optical lens assembly disclosed in the 1st embodiment, a barrel and a holder member (their reference numerals are omitted) for holding the imaging optical lens assembly. However, the lens unit 11 may alternatively be provided with the imaging optical lens assembly disclosed in other embodiments, the present disclosure is not limited thereto. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the imaging optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

8th Embodiment

Figure 20:
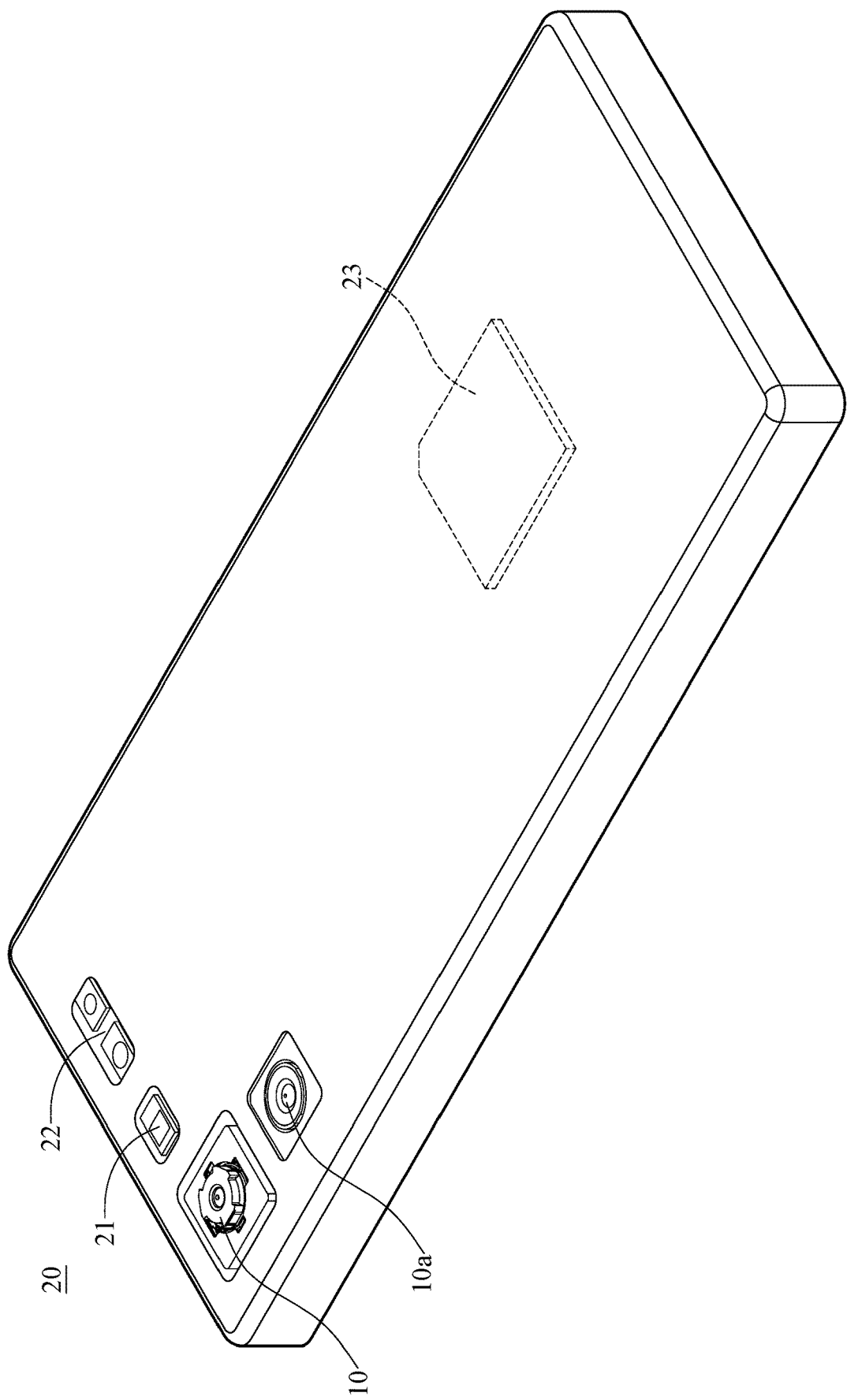
FIG. 20 is one perspective view of an electronic device according to the 8th embodiment of the present disclosure.
Figure 21:
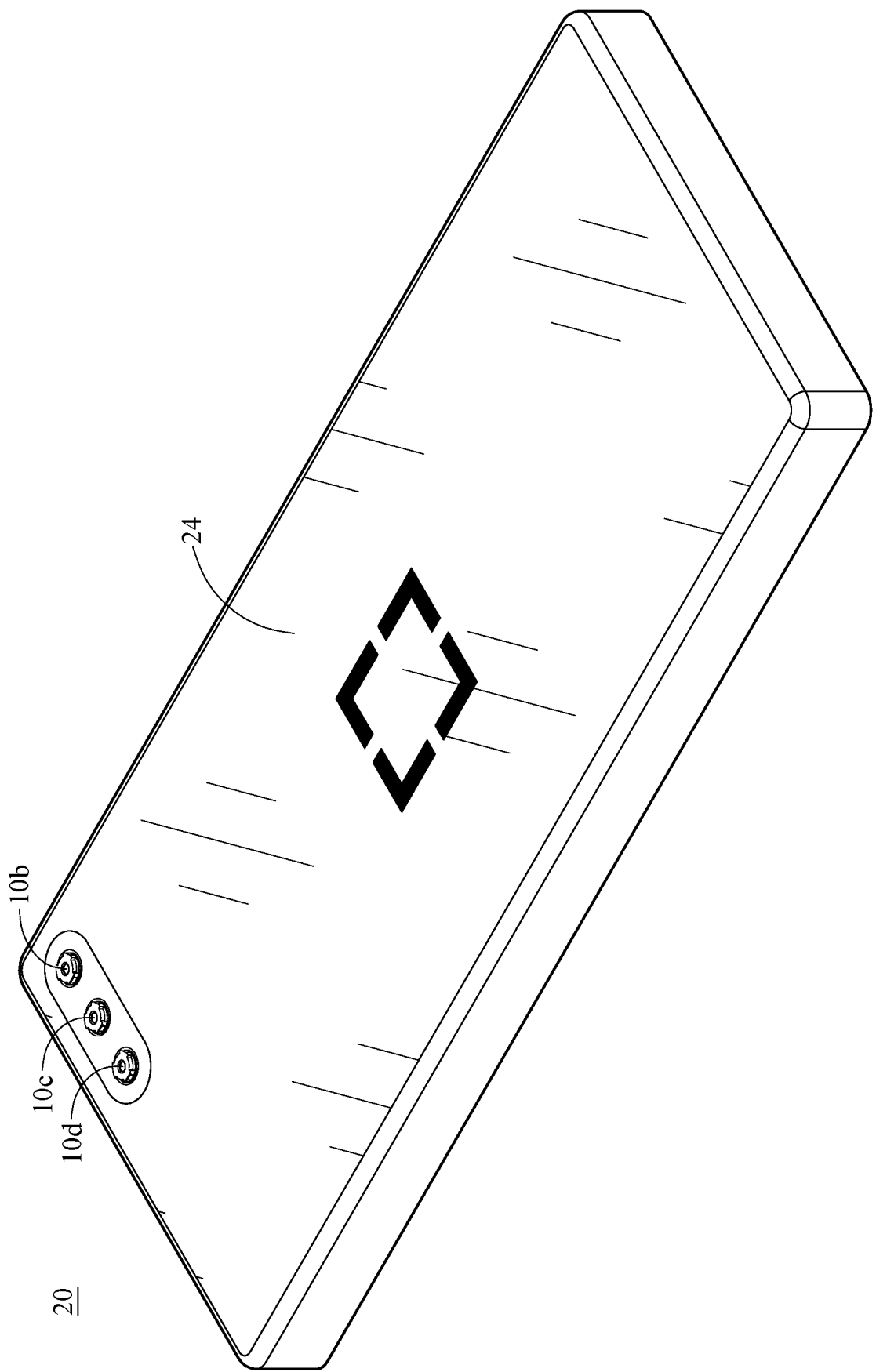
FIG. 21 is another perspective view of the electronic device in FIG. 20.
Figure 22:
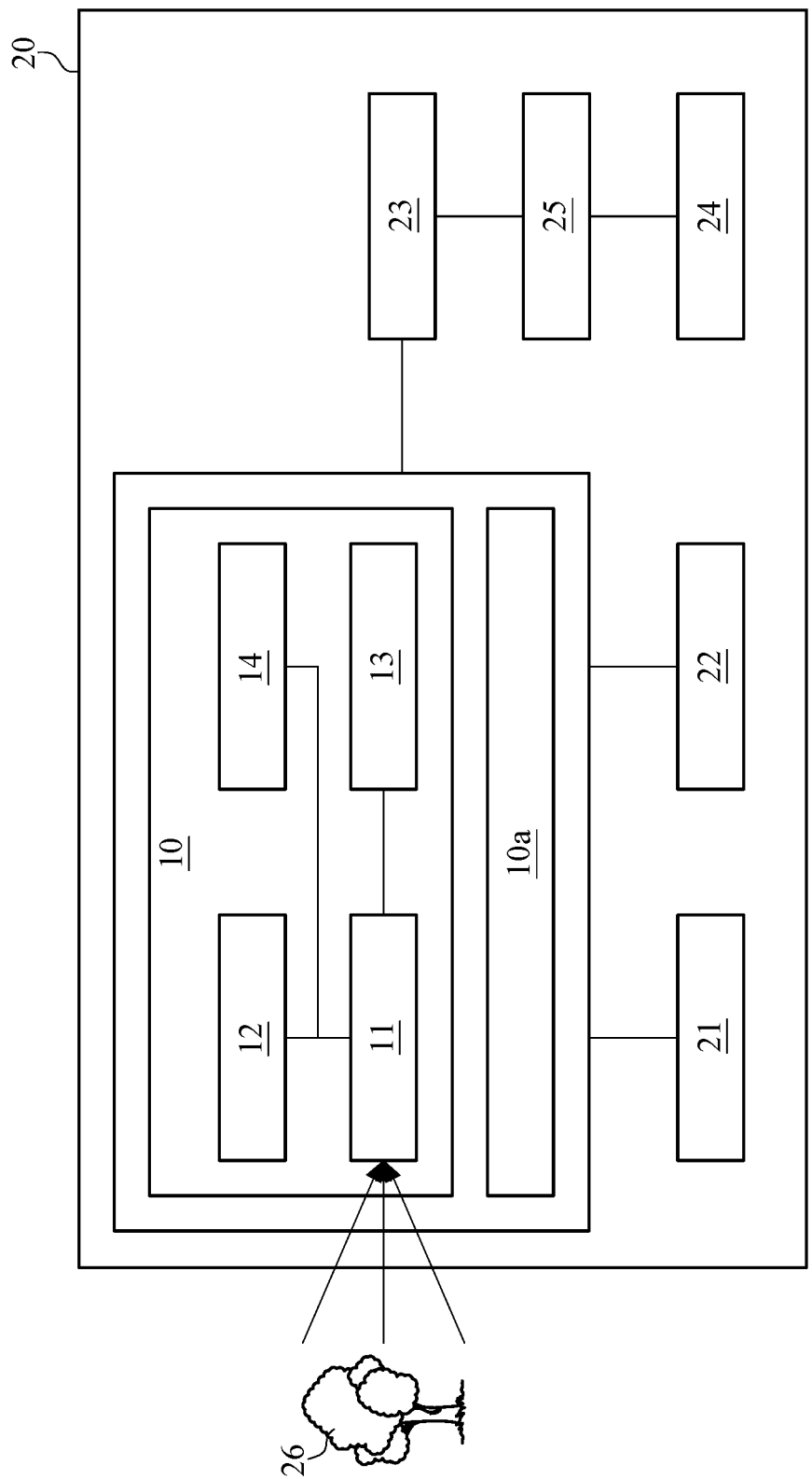
FIG. 22 is a block diagram of the electronic device in FIG. 20.

FIG. 20 is one perspective view of an electronic device according to the 8th embodiment of the present disclosure. FIG. 21 is another perspective view of the electronic device in FIG. 20. FIG. 22 is a block diagram of the electronic device in FIG. 20.

In this embodiment, an electronic device 20 is a smartphone including the image capturing unit 10 disclosed in the 7th embodiment, an image capturing unit 10a, an image capturing unit 10b, an image capturing unit 10c, an image capturing unit 10d, a flash module 21, a focus assist module 22, an image signal processor 23, a display panel 24 and an image software processor 25. The image capturing unit 10 and the image capturing unit 10a are disposed on the same side of the electronic device 20 and each of the image capturing units 10 and 10a has a single focal point. The image capturing unit 10b, the image capturing unit 10c, the image capturing unit 10d and the display panel 24 are disposed on the opposite side of the electronic device 20, such that the image capturing units 10b, 10c, 10d can be front-facing cameras of the electronic device 20 for taking selfies, but the present disclosure is not limited thereto. Furthermore, each of the image capturing units 10a, 10b, 10c and 10d has a configuration similar to that of the image capturing unit 10. In detail, each of the image capturing units 10a, 10b, 10c and 10d includes a lens unit, a driving device, an image sensor and an image stabilizer, and each of the lens unit includes an optical lens assembly, a barrel and a holder member for holding the optical lens assembly.

The image capturing unit 10 is a telephoto image capturing unit, the image capturing unit 10a is a wide-angle image capturing unit, the image capturing unit 10b is a wide-angle image capturing unit, the image capturing unit 10c is an ultra-wide-angle image capturing unit, and the image capturing unit 10d is a ToF (time of flight) image capturing unit. In this embodiment, the image capturing units 10 and 10a have different fields of view, such that the electronic device 20 is favorable for capturing image details in various ranges so as to meet the requirement of various scenarios. In addition, the image capturing unit 10d can determine depth information of the imaged object. In this embodiment, the electronic device 20 includes multiple image capturing units 10, 10a, 10b, 10c and 10d, but the present disclosure is not limited to the number and arrangement of image capturing units.

When a user captures images of an object 26, the light rays converge in the image capturing unit 10 or the image capturing unit 10a to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the light rays may converge in the image capturing unit 10b, 10c or 10d to generate an image(s). The display panel 24 can be a touch screen or have a physical shutter button. The user is able to interact with the display panel 24 and the image software processor 25 having multiple functions to capture images and complete image processing. The image processed by the image software processor 25 can be displayed on the display panel 24.

9th Embodiment

FIG. 23 shows a schematic view of an image capturing unit according to the 9th embodiment of the present disclosure. In this embodiment, an image capturing unit 10e is a camera module including the imaging optical lens assembly with non-circular lens elements and the reflective prism 170" disclosed in the 1st embodiment. The imaging optical lens assembly has, in order from an imaged object (not shown in figures) to the image surface 190 along the optical path, a first optical axis OA1, the reflective prism 170" and a second optical axis OA2. In addition, a direction of a height H of the image capturing unit 10e is parallel to the first optical axis OA1.

In this embodiment, the height H of the image capturing unit 10e is 6.25 mm, and a short side length W of an opening of the image capturing unit 10e is 1.700 mm. Therefore, it is favorable for controlling the product's thickness for portability and minimizing the influence on the appearance for various applications while satisfying specific product specifications.

10th Embodiment

Figure 24:
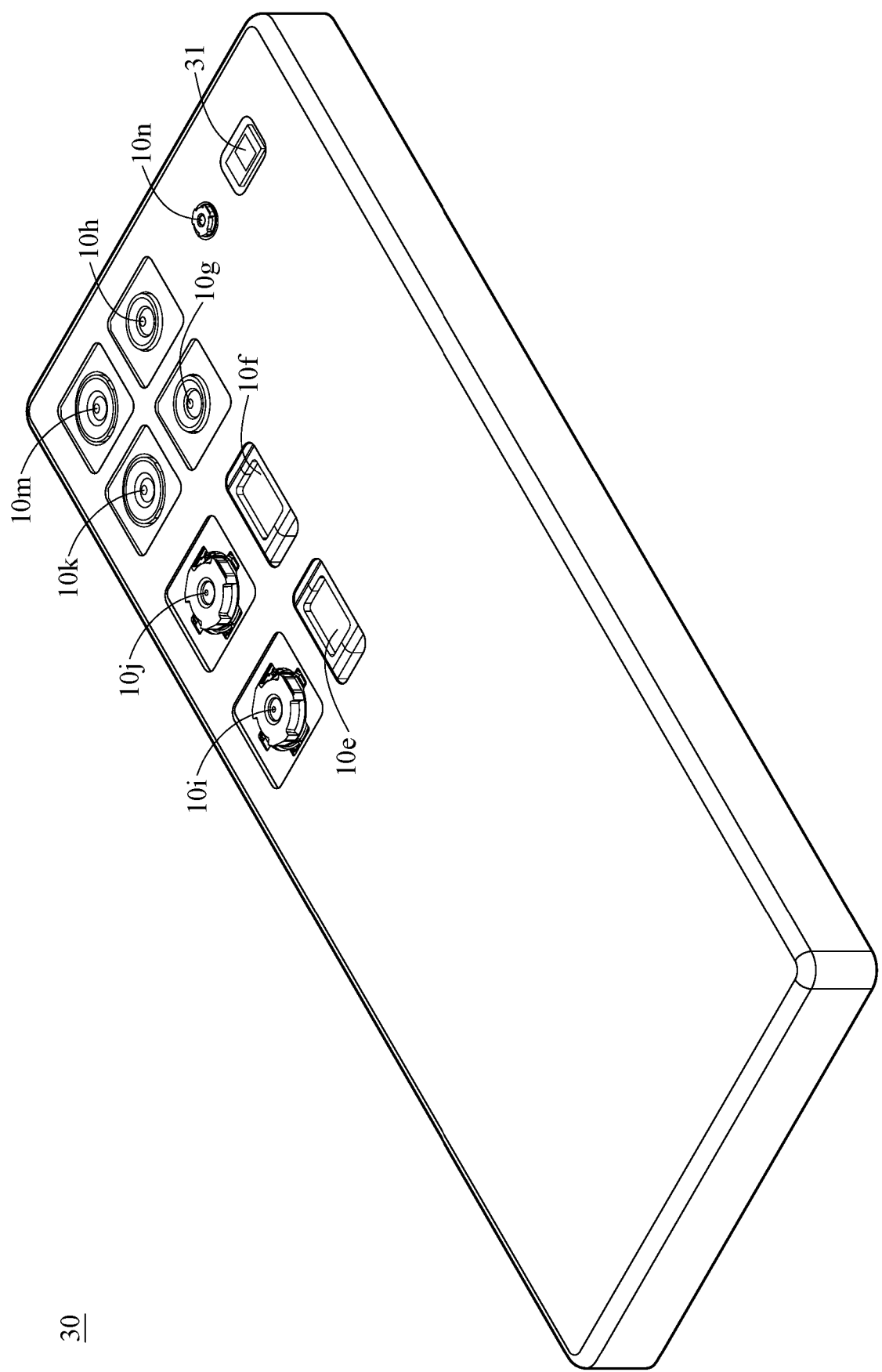
FIG. 24 is a perspective view of an electronic device according to the 10th embodiment of the present disclosure.

FIG. 24 is a perspective view of an electronic device according to the 10th embodiment of the present disclosure.

In this embodiment, an electronic device 30 is a smartphone including the image capturing unit 10e disclosed in the 9th embodiment, an image capturing unit 10*f*, an image capturing unit 10*g*, an image capturing unit 10*h*, an image capturing unit 10*i*, an image capturing unit 10*j*, an image capturing unit 10*k*, an image capturing unit 10*m*, an image capturing unit 10*n*, a flash module 31, a focus assist module, an image signal processor, a display panel and an image software processor (not shown). The image capturing units 10*e*, 10*f*, 10*g*, 10*h*, 10*i*, 10*j*, 10*k*, 10*m* and 10*n* are disposed on the same side of the electronic device 30, and the display panel is disposed on another side of the electronic device 30. Furthermore, each of the image capturing units 10*e*, 10*f*, 10*g*, 10*h*, 10*i*, 10*j*, 10*k*, 10*m* and 10*n* has a configuration similar to that of the image capturing unit 10, and the details in this regard will not be provided again.

The image capturing unit 10*e* is a telephoto image capturing unit configured with reflector(s) (reflective prism 170″), the image capturing unit 10*f* is a telephoto image capturing unit configured with reflector(s), the image capturing unit 10*g* is a telephoto image capturing unit, the image capturing unit 10*h* is a telephoto image capturing unit, the image capturing unit 10*i* is a wide-angle image capturing unit, the image capturing unit 10*j* is a wide-angle image capturing unit, the image capturing unit 10*k* is an ultra-wide-angle image capturing unit, the image capturing unit 10*m* is an ultra-wide-angle image capturing unit, and the image capturing unit 10*n* is a ToF image capturing unit. In this embodiment, the image capturing units 10*e*, 10*f*, 10*g*, 10*h*, 10*i*, 10*j*, 10*k* and 10*m* have different fields of view, such that the electronic device 30 has various magnification ratios so as to meet the requirement of optical zoom functionality. Moreover, the reflectors of the image capturing units 10*e* and 10*f* can adjust the direction of optical axis, such that the total track length of each image capturing unit 10*e* or 10*f* is not limited by the thickness of the electronic device 30. In addition, the image capturing unit 10*n* can determine depth information of the imaged object. In this embodiment, the electronic device 30 includes multiple image capturing units 10*e*, 10*f*, 10*g*, 10*h*, 10*i*, 10*j*, 10*k*, 10*m* and 10*n*, but the present disclosure is not limited to the number and arrangement of image capturing units. When a user captures images of an object, the light rays converge in the image capturing unit 10*e*, 10*f*, 10*g*, 10*h*, 10*i*, 10*j*, 10*k*, 10*m* or 10*n* to generate an image(s), and the flash module 31 is activated for light supplement. Further, the subsequent processes are performed in a manner similar to the abovementioned embodiments, so the details in this regard will not be provided again.

11th Embodiment

Figure 26:
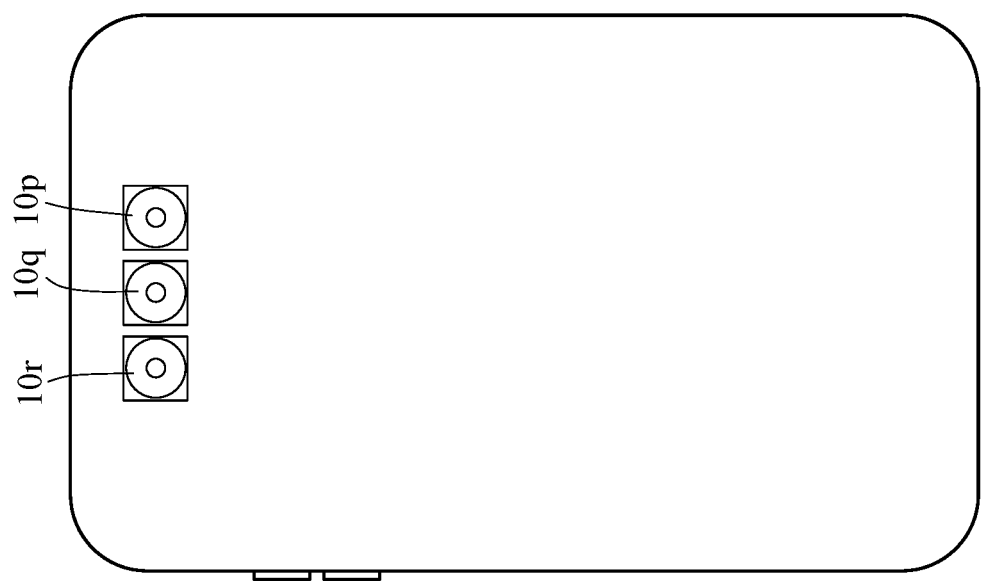
FIG. 26 is another perspective view of the electronic device in FIG. 25.

FIG. 25 is one perspective view of an electronic device according to the 11th embodiment of the present disclosure. FIG. 26 is another perspective view of the electronic device in FIG. 25.

In this embodiment, an electronic device 40 is a smartphone including the image capturing unit 10*e* disclosed in the 9th embodiment, an image capturing unit 10*p*, an image capturing unit 10*q*, an image capturing unit 10*r* and a display panel 44. The image capturing unit 10*e* and the display panel 44 are disposed on the same side of the electronic device 40, such that users can see images towards their direction while photo shooting. In addition, the opening of the image capturing unit 10*e* is non-circular. Therefore, it is favorable for controlling the appearance of the lens assembly module so as to be configured with other electronic modules. The image capturing units 10*p*, 10*q*, and 10*r* are disposed on the opposite side of the electronic device 40. The image capturing unit 10*p* is an ultra-wide-angle image capturing unit, the image capturing unit 10*q* is a wide-angle image capturing unit, and the image capturing unit 10*r* is a telephoto image capturing unit. In this embodiment, the image capturing units 10*p*, 10*q*, and 10*r* have different fields of view, such that the electronic device 40 has various magnification ratios so as to meet the requirement of optical zoom functionality. In this embodiment, the electronic device 40 includes multiple image capturing units 10*e*, 10*p*, 10*q*, and 10*r*, but the present disclosure is not limited to the number and arrangement of image capturing units.

The smartphone in this embodiment is only exemplary for showing the image capturing units 10 and 10*e* of the present disclosure installed in an electronic device, and the present disclosure is not limited thereto. The image capturing units 10 and 10*e* can be optionally applied to optical systems with a movable focus. Furthermore, the imaging optical lens assembly of the image capturing units 10 or 10*e* features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-12 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein a total number of lens elements in the imaging optical lens assembly is six, the object-side surface of the first lens element is concave in a paraxial region thereof, the image-side surface of the first lens element is convex in a paraxial region thereof, the second lens element has positive refractive power, the third lens element has negative refractive power, the image-side surface of the third lens element is concave in a paraxial region thereof, the fourth lens element has positive refractive power, the image-side surface of the sixth lens element is concave in a paraxial region thereof, the image-side surface of the sixth lens element is aspheric and has at least one inflection point, there is an air gap in a paraxial region between each of all adjacent lens elements of the imaging optical lens assembly, and at least one of the six lens elements is made of plastic material;

wherein an axial distance between the object-side surface of the first lens element and an image surface is TL, a focal length of the imaging optical lens assembly is f, an axial distance between the image-side surface of the second lens element and the object-side surface of the third lens element is Dr4r5, an axial distance between the third lens element and the fourth lens element is T34, and the following conditions are satisfied:

0.70<$TL/f$<5.0; and 4.20<$Dr4r5/T34$.

2. The imaging optical lens assembly of claim 1, wherein the object-side surface of the second lens element is concave in a paraxial region thereof, and the image-side surface of the second lens element is convex in a paraxial region thereof.

3. The imaging optical lens assembly of claim 1, wherein the object-side surface of the fifth lens element is convex in a paraxial region thereof, and the object-side surface of the sixth lens element is convex in a paraxial region thereof.

4. The imaging optical lens assembly of claim 1, wherein the axial distance between the object-side surface of the first lens element and the image surface is TL, the focal length of the imaging optical lens assembly is f, and the following condition is satisfied:

1.0<$TL/f$<3.0.

5. The imaging optical lens assembly of claim 1, wherein an Abbe number of the first lens element is V1, and the following condition is satisfied:

10.0<$V1$<40.0.

6. The imaging optical lens assembly of claim 1, wherein the focal length of the imaging optical lens assembly is f, a focal length of the first lens element is f1, and the following condition is satisfied:

−0.50<$f/f1$<0.50.

7. The imaging optical lens assembly of claim 1, further comprising a reflector, wherein the reflector is disposed between the second lens element and the third lens element, the axial distance between the image-side surface of the second lens element and the object-side surface of the third lens element is Dr4r5, the axial distance between the third lens element and the fourth lens element is T34, and the following condition is satisfied:

6.0<$Dr4r5/T34$<20.0.

8. The imaging optical lens assembly of claim 1, wherein a curvature radius of the object-side surface of the second lens element is R3, a curvature radius of the image-side surface of the second lens element is R4, a curvature radius of the object-side surface of the fourth lens element is R7, a curvature radius of the image-side surface of the fourth lens element is R8, and the following conditions are satisfied:

|$R4/R3$|<0.50; and 0.50<$(R7+R8)/(R7-R8)$<1.20.

9. An imaging optical lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein a total number of lens elements in the imaging optical lens assembly is six, the object-side surface of the first lens element is concave in a paraxial region thereof, the image-side surface of the first lens element is convex in a paraxial region thereof, the second lens element has positive refractive power, the third lens element has negative refractive power, the fourth lens element has positive refractive power, the image-side surface of the sixth lens element is concave in a paraxial region thereof, and the image-side surface of the sixth lens element is aspheric and has at least one inflection point;

wherein the imaging optical lens assembly further comprises an aperture stop, an axial distance between the object-side surface of the first lens element and an image surface is TL, a focal length of the imaging optical lens assembly is f, an axial distance between the image-side surface of the second lens element and the object-side surface of the third lens element is Dr4r5, a sum of central thicknesses of all lens elements of the imaging optical lens assembly is ΣCT, an axial distance between the aperture stop and the image surface is SL, and the following conditions are satisfied:

0.70<$TL/f$<5.0;

0.30<$Dr4r5/\Sigma CT$<2.50; and 0.80<$SL/TL$<2.0.

10. The imaging optical lens assembly of claim 9, wherein the image-side surface of the fourth lens element is convex in a paraxial region thereof.

11. The imaging optical lens assembly of claim 9, wherein the image-side surface of the fifth lens element is concave in a paraxial region thereof.

12. The imaging optical lens assembly of claim 9, wherein a minimum value among Abbe numbers of all lens elements of the imaging optical lens assembly is Vdmin, and the following condition is satisfied:

12.0<$Vd$min<20.0.

13. The imaging optical lens assembly of claim 9, wherein a maximum image height of the imaging optical lens assembly is ImgH, the focal length of the imaging optical lens assembly is f, a focal length of the fourth lens element is f4, and the following conditions are satisfied:

0.53<$ImgH/f$<1.50; and 0.80<$f/f4$<2.0.

14. The imaging optical lens assembly of claim 9, wherein the axial distance between the aperture stop and the image surface is SL, the axial distance between the object-side surface of the first lens element and the image surface is TL, a central thickness of the first lens element is CT1, a central thickness of the fourth lens element is CT4, and the following conditions are satisfied:

1.0<$SL/TL$<1.30; and 0.10<$CT1/CT4$<0.90.

15. The imaging optical lens assembly of claim 9, wherein an axial distance between the third lens element and the fourth lens element is T34, an axial distance between the fourth lens element and the fifth lens element is T45, and the following condition is satisfied:

$$2.0 < T34/T45 < 40.0.$$

16. An imaging optical lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
  wherein a total number of lens elements in the imaging optical lens assembly is six, the object-side surface of the first lens element is concave in a paraxial region thereof, the second lens element has positive refractive power, the image-side surface of the second lens element is convex in a paraxial region thereof, the third lens element has negative refractive power, the fourth lens element has positive refractive power, the image-side surface of the sixth lens element is concave in a paraxial region thereof, and the image-side surface of the sixth lens element is aspheric and has at least one inflection point;
  wherein an axial distance between the object-side surface of the first lens element and an image surface is TL, a focal length of the imaging optical lens assembly is f, an axial distance between the image-side surface of the second lens element and the object-side surface of the third lens element is Dr4r5, a sum of central thicknesses of all lens elements of the imaging optical lens assembly is ΣCT, and the following conditions are satisfied:

$$1.25 < TL/f < 2.60; \text{ and}$$

$$0.75 < Dr4r5/\Sigma CT < 1.50.$$

17. The imaging optical lens assembly of claim 16, wherein the object-side surface of the sixth lens element has at least one inflection point, there is an air gap in a paraxial region between each of all adjacent lens elements of the imaging optical lens assembly, a curvature radius of the image-side surface of the fourth lens element is R8, a curvature radius of the object-side surface of the fifth lens element is R9, and the following condition is satisfied:

$$-1.0 < (R8+R9)/(R8-R9) < 0.$$

18. The imaging optical lens assembly of claim 16, wherein the image-side surface of the third lens element is concave in a paraxial region thereof, a central thickness of the first lens element is CT1, a central thickness of the second lens element is CT2, and the following condition is satisfied:

$$CT1/CT2 < 0.90.$$

19. The imaging optical lens assembly of claim 16, wherein a maximum effective radius of the object-side surface of the first lens element is Y11, a curvature radius of the object-side surface of the first lens element is R1, and the following condition is satisfied:

$$-0.70 < Y11/R1 < 0.$$

20. The imaging optical lens assembly of claim 16, wherein an axial distance between the third lens element and the fourth lens element is T34, an axial distance between the fourth lens element and the fifth lens element is T45, an axial distance between the fifth lens element and the sixth lens element is T56, and the following condition is satisfied:

$$0.80 < T34/(T45+T56) < 5.0.$$

21. An imaging optical lens assembly comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;
  wherein a total number of lens elements in the imaging optical lens assembly is six, the second lens element has positive refractive power, the third lens element has negative refractive power, the fourth lens element has positive refractive power, the imaging optical lens assembly further comprises a reflector disposed between the first lens element and the sixth lens element, at least one of the six lens elements has at least one inflection point, and at least one of the six lens elements is made of plastic material;
  wherein an axial distance between the object-side surface of the first lens element and an image surface is TL, a focal length of the imaging optical lens assembly is f, a maximum effective radius of the object-side surface of the first lens element is Y11, a maximum image height of the imaging optical lens assembly is ImgH, half of a maximum field of view of the imaging optical lens assembly is HFOV, and the following conditions are satisfied:

$$0.70 < TL/f < 5.0;$$

$$0.03 < Y11/ImgH < 0.50; \text{ and}$$

$$27.0 \text{ [deg.]} < HFOV < 60.0 \text{ [deg.]}.$$

22. The imaging optical lens assembly of claim 21, wherein the focal length of the imaging optical lens assembly is f, a focal length of the first lens element is f1, an f-number of the imaging optical lens assembly is Fno, and the following conditions are satisfied:

$$-0.30 < f/f1 < 0.10; \text{ and}$$

$$1.0 < Fno < 2.80.$$

23. The imaging optical lens assembly of claim 21, wherein the object-side surface of the first lens element is concave in a paraxial region thereof, the image-side surface of the sixth lens element is concave in a paraxial region thereof, and the first lens element is made of plastic material.

24. The imaging optical lens assembly of claim 21, wherein the image-side surface of the sixth lens element has at least one inflection point, the maximum effective radius of the object-side surface of the first lens element is Y11, the maximum image height of the imaging optical lens assembly is ImgH, and the following condition is satisfied:

$$0.03 < Y11/ImgH < 0.40.$$

25. The imaging optical lens assembly of claim 21, further comprising an aperture stop, wherein an axial distance between the aperture stop and the image surface is SL, the axial distance between the object-side surface of the first lens element and the image surface is TL, the focal length of the imaging optical lens assembly is f, and the following conditions are satisfied:

$0.80 < SL/TL < 2.0$; and $1.0 < TL/f < 3.0$.

26. The imaging optical lens assembly of claim 21, wherein the reflector is a plastic prism, a refractive index of the reflector is Nr, and the following condition is satisfied:

$1.530 < Nr < 1.540$.

27. The imaging optical lens assembly of claim 21, wherein the reflector is disposed between the second lens element and the third lens element.

28. The imaging optical lens assembly of claim 21, further comprising an aperture stop, wherein the aperture stop has a non-circular opening, a maximum value among refractive indices of all lens elements of the imaging optical lens assembly is Nmax, and the following condition is satisfied:

$1.64 < Nmax < 1.75$.

29. The imaging optical lens assembly of claim 21, wherein an edge of at least one of the six lens elements does not form a complete circle, a minimum distance from a center to an outer diameter position of the at least one of the six lens elements whose edge does not form a complete circle is Dmin, a maximum distance from the center to the outer diameter position of the at least one of the six lens elements whose edge does not form a complete circle is Dmax, and the following condition is satisfied:

$Dmin/Dmax < 0.80$.

30. An image capturing unit, comprising:
  the imaging optical lens assembly of claim 21; and
  an image sensor disposed on the image surface of the imaging optical lens assembly;
  wherein a height of the image capturing unit is smaller than 8.0 mm.

31. An image capturing unit, comprising:
  the imaging optical lens assembly of claim 21; and
  an image sensor disposed on the image surface of the imaging optical lens assembly;
  wherein a short side length of an opening of the image capturing unit is smaller than 2.500 mm.

32. An electronic device, comprising a display panel and an image capturing unit, wherein the display panel and the image capturing unit are disposed on same side of the electronic device, and the image capturing unit comprises the imaging optical lens assembly of claim 21 and an image sensor disposed on the image surface of the imaging optical lens assembly.

* * * * *